United States Patent
Fröberg Olsson et al.

(10) Patent No.: US 10,892,871 B2
(45) Date of Patent: *Jan. 12, 2021

(54) BLANKING PATTERN INDICATION FOR RESOURCE UTILIZATION IN CELLULAR RADIO COMMUNICATION

(71) Applicant: Telefonaktiebolaget LM Ericsson (publ), Stockholm (SE)

(72) Inventors: Jonas Fröberg Olsson, Ljungsbro (SE); Andreas Bergström, Linköping (SE); Erik Eriksson, Linköping (SE); Pål Frenger, Linköping (SE); Martin Hessler, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/859,123

(22) Filed: Apr. 27, 2020

(65) Prior Publication Data

US 2020/0287681 A1 Sep. 10, 2020

Related U.S. Application Data

(63) Continuation of application No. 16/040,781, filed on Jul. 20, 2018, now Pat. No. 10,673,589, which is a
(Continued)

(51) Int. Cl.
*H04W 72/00* (2009.01)
*H04L 5/00* (2006.01)
*H04W 72/04* (2009.01)

(52) U.S. Cl.
CPC .......... *H04L 5/0048* (2013.01); *H04L 5/0023* (2013.01); *H04L 5/0051* (2013.01);
(Continued)

(58) Field of Classification Search
CPC ....... H04L 5/00; H04L 5/0048; H04L 5/0023; H04L 5/0073; H04L 5/0051; H04W 72/04; H04W 72/0453
(Continued)

(56) References Cited

U.S. PATENT DOCUMENTS 8,811,246 B2 8/2014 Tulino et al.
9,204,306 B2 12/2015 Hiltunen et al.
(Continued)

FOREIGN PATENT DOCUMENTS

CN 101084690 A 12/2007
CN 102480342 A 5/2012
(Continued)

OTHER PUBLICATIONS

3GPP TS 36.213, 3rd Generation Partnership Project; Technical Specification Group Radio Access Network; Evolved Universal Terrestrial Radio Access (E-UTRA); Physical layer procedures (Release 12), V12.5.0, Mar. 2015.
(Continued)

*Primary Examiner* — Mahendra R Patel
(74) *Attorney, Agent, or Firm* — Coats & Bennett, PLLC

(57) ABSTRACT

A cellular network supports radio communication based on a first configuration which organizes a time-frequency space in first resource elements and radio communication based on a second configuration which organizes the time-frequency space in second resource elements and assigns at least one of the second resource elements to a utilization which is in conflict with the radio communication based on the first configuration. A node of the cellular network sends an indication to a communication device. The indication comprises time domain and/or frequency domain information for defining a pattern comprising at least one of the first resource elements which is to be disregarded by the communication
(Continued)

device when performing radio communication with the cellular network based on the first configuration and/or the second configuration. The at least one first resource element of the pattern defines a first part of the time-frequency space which overlaps a second part of the time-frequency space defined by the at least one of the second resource elements.

27 Claims, 19 Drawing Sheets

Related U.S. Application Data continuation of application No. 15/505,255, filed as application No. PCT/EP2015/067147 on Jul. 27, 2015, now Pat. No. 10,044,480.

(52) U.S. Cl.
CPC ....... *H04L 5/0073* (2013.01); *H04W 72/0453* (2013.01); *H04L 5/0007* (2013.01); *H04L 5/0044* (2013.01); *H04W 72/044* (2013.01)

(58) Field of Classification Search
USPC .......................................................... 455/450
See application file for complete search history.

(56) References Cited

U.S. PATENT DOCUMENTS

| | | | | |
|---|---|---|---|---|
| 9,295,053 | B2* | 3/2016 | Wengerter | H04L 1/1893 |
| 10,044,480 | B2 | 8/2018 | Fröberg Olsson et al. | |
| 2009/0304024 | A1* | 12/2009 | Jou | H04L 1/1854 |
| | | | | 370/465 |
| 2010/0098045 | A1 | 4/2010 | Miyazaki | |
| 2010/0309870 | A1 | 12/2010 | Wengerter et al. | |
| 2010/0311450 | A1* | 12/2010 | Rinne | H04L 5/003 |
| | | | | 455/501 |
| 2011/0176581 | A1* | 7/2011 | Thomas | H04L 5/0026 |
| | | | | 375/146 |
| 2011/0199986 | A1* | 8/2011 | Fong | H04L 5/0073 |
| | | | | 370/329 |
| 2011/0252139 | A1* | 10/2011 | Bhattad | H04L 5/0037 |
| | | | | 709/226 |
| 2011/0286423 | A1* | 11/2011 | Berggren | H04L 5/005 |
| | | | | 370/329 |
| 2012/0120846 | A1* | 5/2012 | Hwang | H04W 24/08 |
| | | | | 370/254 |
| 2012/0176939 | A1* | 7/2012 | Qu | H04L 5/0057 |
| | | | | 370/255 |
| 2013/0194950 | A1* | 8/2013 | Haghighat | H04L 5/0073 |
| | | | | 370/252 |
| 2013/0223258 | A1* | 8/2013 | Seo | H04W 52/243 |
| | | | | 370/252 |
| 2013/0229971 | A1* | 9/2013 | Siomina | H04W 24/10 |
| | | | | 370/312 |
| 2013/0295949 | A1* | 11/2013 | Seo | H04W 72/1278 |
| | | | | 455/452.1 |
| 2014/0064133 | A1* | 3/2014 | Kazmi | H04W 24/10 |
| | | | | 370/252 |
| 2014/0119332 | A1* | 5/2014 | Kim | H04W 52/58 |
| | | | | 370/330 |
| 2014/0119334 | A1* | 5/2014 | Kazmi | H04W 24/10 |
| | | | | 370/330 |
| 2014/0226541 | A1* | 8/2014 | Xu | H04W 56/0015 |
| | | | | 370/280 |
| 2015/0029891 | A1 | 1/2015 | Hwang et al. | |
| 2015/0036524 | A1* | 2/2015 | Kim | H04B 17/00 |
| | | | | 370/252 |
| 2015/0049621 | A1* | 2/2015 | Liu | H04L 5/0057 |
| | | | | 370/252 |
| 2015/0055502 | A1* | 2/2015 | Seo | H04J 11/0056 |
| | | | | 370/252 |
| 2015/0092655 | A1* | 4/2015 | Liao | H04L 5/0007 |
| | | | | 370/312 |
| 2015/0124733 | A1* | 5/2015 | Lim | H04W 52/244 |
| | | | | 370/329 |
| 2015/0208410 | A1* | 7/2015 | Koutsimanis | H04W 72/0426 |
| | | | | 370/252 |
| 2015/0289208 | A1* | 10/2015 | Liu | H04L 5/001 |
| | | | | 370/252 |

FOREIGN PATENT DOCUMENTS

| | | | | |
|---|---|---|---|---|
| CN | 104041103 | A | 9/2014 | |
| CN | 104081849 | A | 10/2014 | |
| EP | 2498436 | A2 | 9/2012 | |
| EP | 2498436 | A3 * | 4/2014 | .......... H04L 5/0057 |
| JP | 2014511067 | A | 5/2014 | |
| RU | 2495529 | C1 | 10/2013 | |
| WO | WO-2009080290 | A1 * | 7/2009 | .......... H04L 1/1896 |
| WO | 2011044172 | A2 | 4/2011 | |
| WO | 2012121562 | A2 | 9/2012 | |
| WO | 2014021762 | A1 | 2/2014 | |
| WO | WO-2014021762 | A1 * | 2/2014 | .......... H04L 5/0005 |

OTHER PUBLICATIONS

3GPP TS 36.211, 3rd Generation Partnership Project; Technical Specification Group Radio Access Network; Evolved Universal Terrestrial Radio Access (E-UTRA); Physical channels and modulation (Release 12), V12.6.0, Jun. 2015.
Intel Corporation (UK) Ltd., "Signalling and power utilization considerations for PDSCH muting", 3GPP TSG RAN WG1 Meeting #62, Madrid, Spain, Aug. 23, 2010, pp. 1-9, R1-104376.

* cited by examiner

BLANKING PATTERN INDICATION FOR RESOURCE UTILIZATION IN CELLULAR RADIO COMMUNICATION

RELATED APPLICATIONS

This application is a continuation of U.S. patent application Ser. No. 16/040,781 filed Jul. 20, 2018, which is a continuation of U.S. patent application Ser. No. 15/505,255, filed Feb. 21, 2017, U.S. patent Ser. No. 10/044,480 issued Aug. 7, 2018, which is the U.S. National Stage filing of PCT application PCT/EP2015/067147, filed 27 Jul. 2015, each of which is incorporated herein by reference in their entireties.

TECHNICAL FIELD

The present invention relates to methods for controlling radio communication in a cellular network and to corresponding devices.

BACKGROUND

When a radio technology evolves by introducing new features, it is typically desirable that later versions of the radio technology are backward compatible with earlier versions. In this way, both versions can coexist in the same radio communication system.

An example of such evolution of a radio technology is the LTE (Long Term Evolution) cellular radio technology specified by 3GPP (3rd Generation Partnership Project). Here, for example a user equipment (UE) according to the LTE Release 8 (Rel-8) specifications and a UE according to the LTE Release 10 (Rel-10) specifications may coexist in a cellular network according to the LTE Rel-10 specifications. Further, a UE according to the LTE Rel-10 specifications could utilize a cellular network according to the LTE Rel-8 specifications.

One exemplary difference between the cellular radio technology according to LTE Rel-8 and the cellular radio technology according to LTE Rel-10 resides in the utilization of reference signals. In LTE Rel-10 Channel State Information Reference Signals (CSI-RS) are defined for the purpose of providing Channel State Information (CSI). As compared to that, in LTE Rel-8, CSI measurements rely on Cell-specific Reference Signals (CRS). A UE supporting LTE Rel-10 (in the following also referred to as Rel-10 UE) is aware when and where the CSI-RS are present in the received signals. However, such awareness is not present in the case of a UE supporting only LTE Rel-8 (in the following also referred to as Rel-8 UE). As a result, it may occur that the Rel-8 UE assumes that data is present in resource elements that are used for transmitting the CSI-RS. Thus, if the Rel-8 UE would be scheduled for a transmission in a subframe which contains CSI-RS, the transmission would probably fail. While this problem could be mitigated by not scheduling Rel-8 UEs in subframes containing CSI-RS, such exclusion of subframes for an entire class of UEs may be unduly limiting. Further, also the possibility of configuring zero-power CSI-RS as specified in 3GPP TS 36.213 V12.5.0 (2015 March) does not help, because it only allows for configuring certain predefined CSI-RS constellations as zero power and is not supported for Rel-8 UEs.

In a similar manner, features of an earlier version of a radio technology may have an impact on a later version of this radio technology. For example, the CRS of LTE Rel-8 are typically not needed when performing radio communication with Rel-10 UEs. On the other hand, transmission of the CRS may not be deactivated because Rel-8 UEs rely on them. If the CRSs are not present in a cell, this may prevent a Rel-8 UE from connecting to this cell. As a result, the CRSs typically need to be transmitted in all subframes and all Physical Resource Blocks (PRBs), even if currently no Rel-8 UEs are present in the system. Such requirement of continued transmission of certain signals may constitute a significant limitation, e.g., with respect to energy efficiency or efficiency of resource utilization.

Accordingly, there is a need for techniques which allow for efficiently controlling radio communication in a cellular network supporting radio communication based different and potentially conflicting configurations.

SUMMARY

According to an embodiment of the invention, a method of controlling radio communication in a cellular network is provided. The cellular network is assumed to support radio communication based on a first configuration which organizes a time-frequency space in first resource elements and radio communication based on a second configuration which organizes the time-frequency space in second resource elements and assigns at least one of the second resource elements to a utilization which is in conflict with the radio communication based on the first configuration. According to the method, a node of the cellular network sends an indication to a communication device. The indication comprises time domain and/or frequency domain information for defining a pattern comprising at least one of the first resource elements which is to be disregarded by the communication device when performing radio communication with the cellular network based on the first configuration and/or the second configuration. The at least one first resource element of the pattern defines a first part of the time-frequency space which overlaps a second part of the time-frequency space defined by the at least one of the second resource elements.

According to a further embodiment of the invention, a method of controlling radio communication in a cellular network is provided. The cellular network is assumed to support radio communication based on a first configuration which organizes a time-frequency space in first resource elements and radio communication based on a second configuration which organizes the time-frequency space in second resource elements and assigns at least one of the second resource elements to a utilization which is in conflict with the radio communication based on the first configuration. According to the method, a node of the cellular network receives an indication. The indication comprises time domain and/or frequency domain information for defining a pattern comprising at least one of the first resource elements. The at least one of the first resource elements defines a first part of the time-frequency space which overlaps a second part of the time-frequency space defined by the at least one of the second resource elements. When performing radio communication based on the first configuration and/or the second configuration with a communication device, the node disregards the at least one first resource element of the pattern.

According to a further embodiment of the invention, a method of controlling radio communication in a cellular network is provided. The cellular network is assumed to support radio communication based on a first configuration which organizes a time-frequency space in first resource elements and radio communication based on a second configuration which organizes the time-frequency space in second resource elements and assigns at least one of the second resource elements to a utilization which is in conflict with the radio communication based on the first configuration. According to the method, a communication device receives an indication from the cellular network. The indication comprises time domain and/or frequency domain information for defining a pattern comprising at least one of the first resource elements. The at least one of the first resource elements defines a first part of the time-frequency space which overlaps a second part of the time-frequency space defined by the at least one of the second resource elements. When performing radio communication based on the first configuration and/or the second configuration with the cellular network, the communication device disregards the at least one first resource element of the pattern.

According to a further embodiment of the invention, a node for a cellular network is provided. The cellular network is assumed to support radio communication based on a first configuration which organizes a time-frequency space in first resource elements and radio communication based on a second configuration which organizes the time-frequency space in second resource elements and assigns at least one of the second resource elements to a utilization which is in conflict with the radio communication based on the first configuration. The node comprises an interface to a communication device and at least one processor. The at least one processor is configured to send an indication to the communication device. The indication comprises time domain and/or frequency domain information for defining a pattern comprising at least one of the first resource elements which is to be disregarded by the communication device when performing radio communication with the cellular network based on the first configuration and/or the second configuration. The at least one first resource element of the pattern defines a first part of the time-frequency space which overlaps a second part of the time-frequency space defined by the at least one of the second resource elements.

According to a further embodiment of the invention, a node for a cellular network is provided. The cellular network is assumed to support radio communication based on a first configuration which organizes a time-frequency space in first resource elements and radio communication based on a second configuration which organizes the time-frequency space in second resource elements and assigns at least one of the second resource elements to a utilization which is in conflict with the radio communication based on the first configuration. The node comprises an interface to a communication device and at least one processor. The at least one processor is configured to receive an indication. The indication comprises time domain and/or frequency domain information for defining a pattern comprising at least one of the first resource elements. The at least one of the first resource elements defines a first part of the time-frequency space which overlaps a second part of the time-frequency space defined by the at least one of the second resource elements. Further, the at least one processor is configured to disregard the at least one first resource element of the pattern when performing radio communication based on the first configuration and/or the second configuration with the communication device.

According to a further embodiment of the invention, a communication device is provided. The communication device comprises an interface to a cellular network and at least one processor. The cellular network is assumed to support radio communication based on a first configuration which organizes a time-frequency space in first resource elements and radio communication based on a second configuration which organizes the time-frequency space in second resource elements and assigns at least one of the second resource elements to a utilization which is in conflict with the radio communication based on the first configuration. The at least one processor is configured to receive an indication from the cellular network. The indication comprises time domain and/or frequency domain information for defining a pattern comprising at least one of the first resource elements. The at least one of the first resource elements defines a first part of the time-frequency space which overlaps a second part of the time-frequency space defined by the at least one of the second resource elements. Further, the at least one processor is configured to disregard the at least one first resource element of the pattern when performing radio communication based on the first configuration and/or the second configuration with the cellular network.

According to a further embodiment of the invention, a computer program or computer program product is provided, e.g., in the form of a non-transitory storage medium, which comprises program code to be executed by at least one processor of a node of a cellular network. The cellular network is assumed to support radio communication based on a first configuration which organizes a time-frequency space in first resource elements and radio communication based on a second configuration which organizes the time-frequency space in second resource elements and assigns at least one of the second resource elements to a utilization which is in conflict with the radio communication based on the first configuration. Execution of the program code by the at least one processor causes the node to send an indication to a communication device. The indication comprises time domain and/or frequency domain information for defining a pattern comprising at least one of the first resource elements which is to be disregarded by the communication device when performing radio communication with the cellular network based on the first configuration and/or the second configuration. The at least one first resource element of the pattern defines a first part of the time-frequency space which overlaps a second part of the time-frequency space defined by the at least one of the second resource elements.

According to a further embodiment of the invention, a computer program or computer program product is provided, e.g., in the form of a non-transitory storage medium, which comprises program code to be executed by at least one processor of a node of a cellular network. The cellular network is assumed to support radio communication based on a first configuration which organizes a time-frequency space in first resource elements and radio communication based on a second configuration which organizes the time-frequency space in second resource elements and assigns at least one of the second resource elements to a utilization which is in conflict with the radio communication based on the first configuration. Execution of the program code by the at least one processor causes the node to receive an indication. The indication comprises time domain and/or frequency domain information for defining a pattern comprising at least one of the first resource elements. The at least one of the first resource elements defines a first part of the time-frequency space which overlaps a second part of the time-frequency space defined by the at least one of the second resource elements. Further, execution of the program code by the at least one processor causes the node to disregard the at least one first resource element of the pattern when performing radio communication based on the first configuration and/or the second configuration with a communication device.

According to a further embodiment of the invention, a computer program or computer program product is provided, e.g., in the form of a non-transitory storage medium, which comprises program code to be executed by at least one processor of a communication device for a cellular network. The cellular network is assumed to support radio communication based on a first configuration which organizes a time-frequency space in first resource elements and radio communication based on a second configuration which organizes the time-frequency space in second resource elements and assigns at least one of the second resource elements to a utilization which is in conflict with the radio communication based on the first configuration. Execution of the program code by the at least one processor causes the communication device to receive an indication from the cellular network. The indication comprises time domain and/or frequency domain information for defining a pattern comprising at least one of the first resource elements. The at least one of the first resource elements defines a first part of the time-frequency space which overlaps a second part of the time-frequency space defined by the at least one of the second resource elements. Further, execution of the program code by the at least one processor causes the communication device to disregard the at least one first resource element of the pattern when performing radio communication based on the first configuration and/or the second configuration with the cellular network.

Details of such embodiments and further embodiments will be apparent from the following detailed description of embodiments.

DETAILED DESCRIPTION OF EMBODIMENTS

In the following, concepts in accordance with exemplary embodiments of the invention will be explained in more detail and with reference to the accompanying drawings. The illustrated embodiments relate to concepts for controlling radio communication in a cellular network. The embodiments specifically refer to a scenario based on utilizing the LTE radio technology. However, it should be understood that the concepts could also be applied in connection with other radio access technologies, e.g., future evolutions of the LTE radio technology, e.g., a 5G (5th Generation) cellular radio technology.

Figure 1:
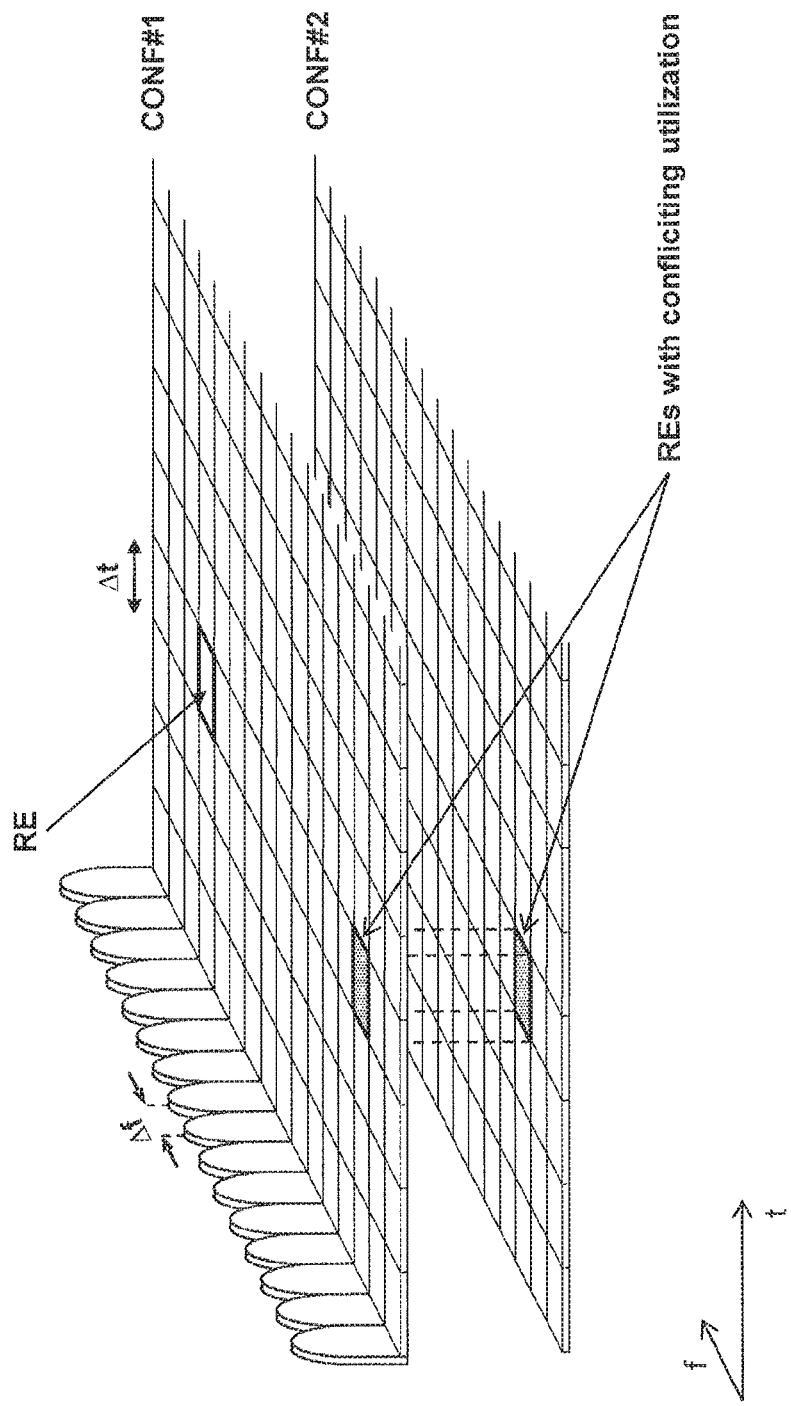
FIG. 1 schematically illustrates an example of configurations which may be applied for radio communication according to an embodiment of the invention.

FIG. 1 illustrates an example of different configurations (CONF #1, CONF #2) which may be applied for radio communication in the cellular network. As illustrated, each configuration is based on organizing a time-frequency space in resource elements (REs). In the illustrated example, this organization is assumed to be based on a time-frequency grid as specified for the LTE radio technology. As illustrated, the time-frequency grid comprises a plurality of REs. In the frequency domain, each RE extends over a frequency bandwidth corresponding to a subcarrier spacing $\Delta f$ of 15 kHz. In the time domain, each RE extends over a time slot $\Delta t$ having the duration of one Orthogonal Frequency Division Multiplexing (OFDM) symbol. In the illustrated example, the first configuration and the second configuration are assumed to be based on the same time-frequency grid, i.e., the same subcarrier widths and the same modulation symbol durations. However, the first configuration and the second configuration may also be based on different time-frequency grids. For example, the first configuration may be based on a first time-frequency grid and the second configuration may be based on a second time-frequency grid, and the first time-frequency grid may differ with respect to the subcarrier spacing $\Delta f$ and/or modulation symbol duration $\Delta t$. In the following, the REs of the first configuration will also be referred to as first REs, and the REs of the second configuration will also be referred to as second REs.

In the illustrated concepts, it is assumed that each configuration may assign its REs to a certain utilization. Examples of such utilization are transmission of data, transmission of control signals, or transmission of reference signals. Further, it is assumed that for at least one of the second REs the assigned utilization is in conflict with radio communication based on the first configuration. As illustrated, such conflict may arise if a part of the time frequency space defined by one of the first resource elements overlaps a part of the time frequency space defined by one of the second resource elements, and this first resource element and this second resource element are assigned to different utilizations. For example, the first resource element could be assigned to transmission of data while the second resource element is assigned to transmission of a reference signal.

Further, the first resource element could be assigned to transmission of a first type of reference signal and the second resource element could be assigned to transmission of a second type of reference signal which differs from the first type of reference signal. Further, the first resource element could be assigned to transmission of a reference signal, while the second resource element is assigned to no transmission of a reference signal or to no transmission of any signal.

According to the illustrated concepts, a UE or network node performing radio communication based on the first configuration and/or second configuration can be configured with a blanking pattern which defines REs of the first configuration which are to be disregarded when performing radio communication based on the first configuration and/or second configuration. In this way, adverse impacts due to the conflicting utilization can be avoided. The configuration of the blanking pattern is accomplished by transmitting an indication, in the following also referred to as "blanking pattern indication". The blanking pattern indication includes time domain information and/or frequency domain information for defining the blanking pattern. For example, the time domain information may be provided in the form of a time coordinate, e.g., a symbol index or other time domain coordinate, identifying the time domain position of the RE(s) to be disregarded. Similarly, the frequency domain information may be provided in the form of a frequency coordinate, e.g., a subcarrier index or other frequency domain coordinate, identifying the frequency domain position of the RE(s) to be disregarded. Further, the time domain information and/or frequency domain information may include an information element for identifying groups of the REs, e.g., an index for identifying a Physical Resource Block (PRB) as defined in the LTE radio technology. Accordingly, the blanking pattern indication could for example comprise a PRB index for identifying a certain PRB, and a subcarrier index and/or symbol index identifying one or more REs within this PRB.

The blanking pattern indication may for example be used to configure a UE operating according to an older version of the LTE radio technology with a blanking pattern corresponding to REs which are utilized for transmission of reference signals of a newer version of the LTE radio technology, which are not defined for the older version. In such example, the first configuration would correspond to the utilization of the time-frequency space according to the older version and the second configuration would correspond to the utilization of the time frequency space according to the newer version.

The disregarding of the REs may for example involve mapping no data or reference signals to the REs. In a transmit direction from the entity (UE or network node) disregarding the REs, this effectively means that the REs are excluded from carrying transmitted signals. In a receive direction to the entity disregarding the REs, this effectively means that no signals are expected on the REs. However, signals may in fact be transmitted in these REs. The disregarding of the REs may involve rate matching the transmitted or received signals around the disregarded REs. These operations may be accomplished irrespective of other configurations, such as resource allocations for data transmission or configured reference signal constellations.

The blanking pattern indication may also comprise information for defining how the indicated blanking pattern is to be applied. This information will in the following also be referred to as "usage indicator". The usage indicator may for example indicate whether the blanking pattern is to be applied for downlink transmissions from the cellular network to the UE or for uplink transmissions from the UE to the cellular network. Further, the usage indicator may indicate an association of the blanking pattern to certain signals (e.g., synchronization signals) or to certain transmission resources, e.g., antenna ports. Further, the blanking pattern indication may also include multiple sets of time domain information and/or frequency domain information and further information defining how these sets shall be combined to define the blanking pattern. Each of such multiple sets may include at least one of a time coordinate and a frequency coordinate. In typical scenarios, one ore more of such multiple sets may include a frequency coordinate and one or more others of such multiple sets may include a time coordinate, so that complex blanking patterns may be efficiently and flexibly defined by the combination of these multiple sets.

The blanking pattern indication may be used to facilitate achieving backward compatibility when introducing new features to the radio technology, which require different utilization of some part of the time frequency space, e.g., when introducing new reference signals or deactivating previously supported reference signals. By means of the blanking pattern indication, any entities (communication devices, such as UEs, but also network nodes, such as base stations or other kinds of access nodes) not supporting the modified utilization of the time frequency space may be configured to disregard the corresponding resource elements, so that adverse effects on radio communication by these entities can be avoided. By including the time domain information and/or frequency domain information in the blanking pattern indication, various kinds of blanking patterns can be defined in a flexible and future-proof manner.

Figure 2A:
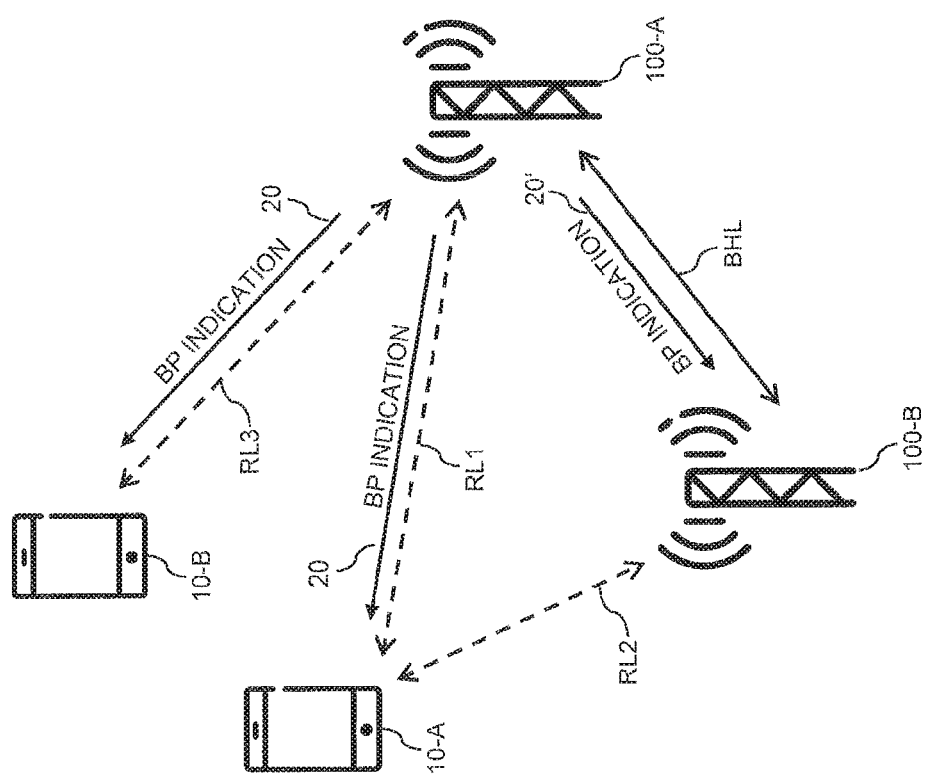
FIGS. 2A, 2B, and 2C schematically illustrate exemplary scenarios of utilizing a blanking pattern indication according to an embodiment of the invention.
Figure 2B:
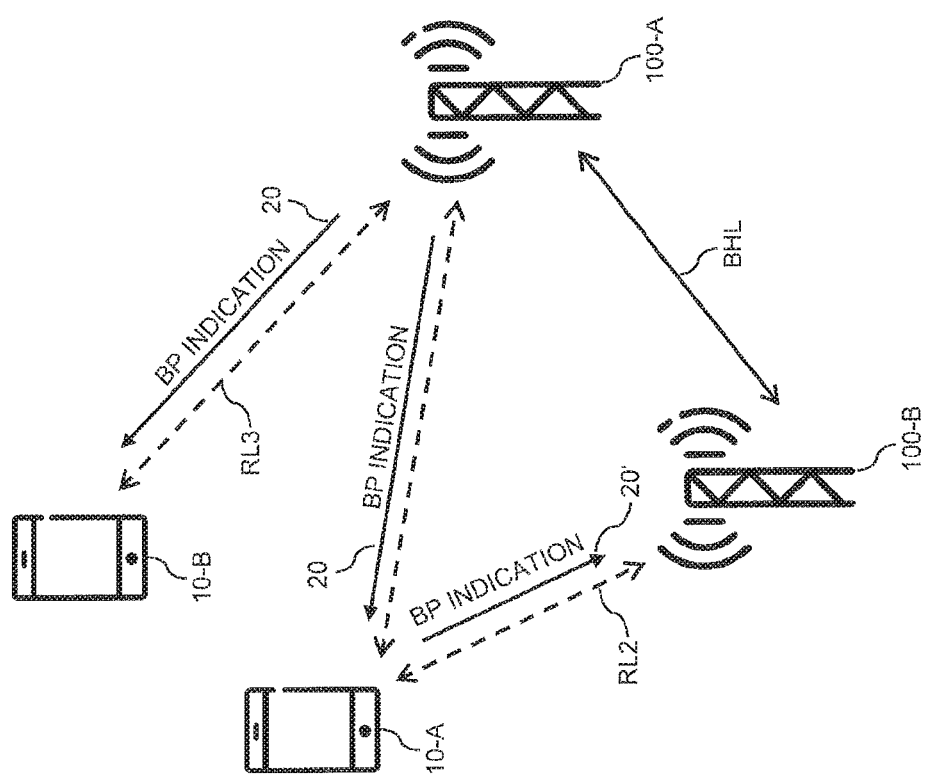
Figure 2C:
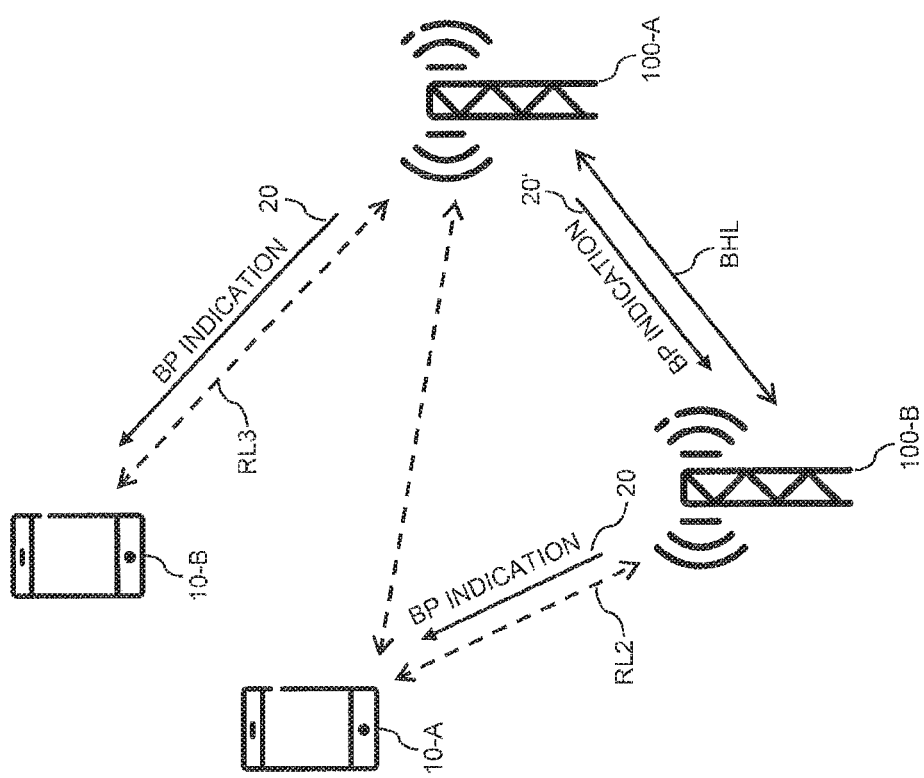

FIGS. 2A, 2B, and 2C show different exemplary scenarios in which the above-mentioned blanking pattern indication is used to configure communication devices and network nodes with the blanking pattern. The illustrated scenarios involve UEs 10-A and 10-B and base stations 100-A and 100-B (e.g., eNBs as specified for the LTE radio technology). Some of the illustrated devices, the UE 10-A and the base station 100-B, are assumed to perform radio communication based on the first configuration, while the other devices, the UE 10-B and the base station 100-A, are assumed to perform radio communication based on the second configuration. This may for example be due to the UE 10-A and the base station 100-B not having support for the second configuration or because the support of the second configuration is deactivated for these devices. The base station 100-A and optionally also the UE 10-B may in turn support simultaneous utilization of the first configuration and of the second configuration.

As illustrated, the UE 10-A is connected by a radio link RL1 to the base station 100-A and by a further radio link RL2 to the base station 100-B. These radio links are based on the first configuration. These radio links RL1, RL2 may be utilized simultaneously, e.g., when performing cooperative radio communication, such as link aggregation, or may be utilized one after the other, e.g., when performing a handover from the base station 100-A to the base station 100-B. Similarly, the UE 10-B is connected by a radio link RL3 to the base station 100-A. The radio links may for example be based on the Uu interface of the LTE radio technology This radio link is based on the second configuration. As further illustrated, the base station 100-A and the base station 100-B may be connected by a backhaul link BHL, e.g., based on the X2 interface of the LTE radio technology.

In the scenario of FIG. 2A, the base station 100-A determines the blanking pattern to be applied for radio communication with the UE 10-A. The base station 100-A, which is aware of the utilization of the time frequency space in both the first configuration and the second configuration, may determine the blanking pattern by first identifying the REs of the second configuration which are assigned to a conflicting utilization and then determining the corresponding REs of the first configuration, which form the blanking pattern. The base station 100-A may then send a corresponding blanking pattern indication 20 to the UE 10-A. As mentioned above, the blanking pattern indication 20 includes the time domain information and/or frequency domain information for defining the blanking pattern and optionally also the usage indicator. As illustrated, the blanking pattern indication 20 is sent via the radio link RL1 connecting the UE 10-A and the base station 100-A. The blanking pattern indication 20 may for example be sent in an information element of a message of a Radio Link Control (RLC) protocol used for the radio link RL1. In response to receiving the blanking pattern indication 20, the UE 10-A disregards the REs of the blanking pattern when performing radio communication based on the first configuration, e.g., on the radio link RL1 or on the radio link RL2.

As further illustrated, the base station 100-A may also send the blanking pattern indication 20 to the UE 10-B, which may be accomplished via the radio link RL3 connecting the UE 10-B and the base station 100-A. In this case, the blanking pattern indication 20 may for example be sent in an information element of a message of an RLC protocol used for the radio link RL3. In response to receiving the blanking pattern indication 20, the UE 10-B may determine the REs of the second configuration which correspond to the REs of the blanking pattern and disregard these REs when performing radio communication based on the second configuration, e.g., on the radio link RL3.

As further illustrated, the base station 100-A may also send a further blanking pattern indication 20' to the base station 100-B, which may be accomplished via the backhaul link BHL connecting the base station 100-A and the base station 100-B. The further blanking pattern indication 20' may have the same or similar content as the blanking pattern indication 20, i.e., include the time domain information and/or frequency domain information for defining the blanking pattern and optionally also the usage indicator. However, a different message type or protocol type may be used for transmitting the further blanking pattern indication 20', i.e., an information element of a message of the X2 Application Protocol. In response to receiving the further blanking pattern indication 20', the base station 100-B may disregard the REs of the blanking pattern when performing radio communication based on the first configuration, e.g., on the radio link RL2.

In the scenario of FIG. 2B, the base station 100-A determines the blanking pattern to be applied for radio communication with the UE 10-A and sends the blanking pattern indication 20 via the radio link RL1 to the UE 10-A, similar to the scenario of FIG. 2A. In response to receiving the blanking pattern indication 20, the UE 10-A disregards the REs of the blanking pattern when performing radio communication based on the first configuration, e.g., on the radio link RL1 or on the radio link RL2. Further, the base station 100-A may also send the blanking pattern indication 20 to the UE 10-B, similar to the scenario of FIG. 2A. In response to receiving the blanking pattern indication 20, the UE 10-B may determine the REs of the second configuration which correspond to the REs of the blanking pattern and disregard these REs when performing radio communication based on the second configuration, e.g., on the radio link RL3.

However, contrary to the scenario of FIG. 2A, the base station 100-A does not send the further blanking pattern indication 20' via the backhaul link BHL to the base station 100-B. Rather, after receiving the blanking pattern indication 20, the UE 10-A may send a further blanking pattern indication 20' to the base station 100-B, which may be accomplished via the radio link RL2 to the base station 100-B. In this case, the further blanking pattern indication 20' may for example be sent in an information element of a message of an RLC protocol used for the radio link RL2. The further blanking pattern indication 20' may have the same or similar content as the blanking pattern indication 20, i.e., include the time domain information and/or frequency domain information for defining the blanking pattern and optionally also the usage indicator. In response to receiving the further blanking pattern indication 20', the base station 100-B may disregard the REs of the blanking pattern when performing radio communication based on the first configuration, e.g., on the radio link RL2.

Also in the scenario of FIG. 2C, the base station 100-A determines the blanking pattern to be applied for radio communication with the UE 10-A, similar to the scenarios of FIGS. 2A and 2B. Further, the base station 100-A may also send the blanking pattern indication 20 to the UE 10-B, similar to the scenario of FIG. 2A. In response to receiving the blanking pattern indication 20, the UE 10-B may determine the REs of the second configuration which correspond to the REs of the blanking pattern and disregard these REs when performing radio communication based on the second configuration, e.g., on the radio link RL3.

However, contrary to the scenarios of FIGS. 2A and 2B, the base station 100-A does not send the blanking pattern indication 20 via the radio link RL1 to the UE 10-A. Rather, the base station 100-A sends a further blanking pattern indication 20' to the base station 100-B, which may be accomplished via the backhaul link BHL connecting the base station 100-A and the base station 100-B. The further blanking pattern indication 20' may have the same or similar content as the blanking pattern indication 20, i.e., include the time domain information and/or frequency domain information for defining the blanking pattern and optionally also the usage indicator. However, a different message type or protocol type may be used for transmitting the further blanking pattern indication 20', i.e., an information element of a message of the X2 Application Protocol. In response to receiving the further blanking pattern indication 20', the base station 100-B may disregard the REs of the blanking pattern when performing radio communication based on the first configuration, e.g., on the radio link RL2. Further, after receiving the further blanking pattern indication 20', the base station 100-B may send the blanking pattern indication 20 to the UE 10-A, which may be accomplished via the radio link RL2. In response to receiving the blanking pattern indication 20, the UE 10-A disregards the REs of the blanking pattern when performing radio communication based on the first configuration, e.g., on the radio link RL1 or on the radio link RL2.

Figure 3:
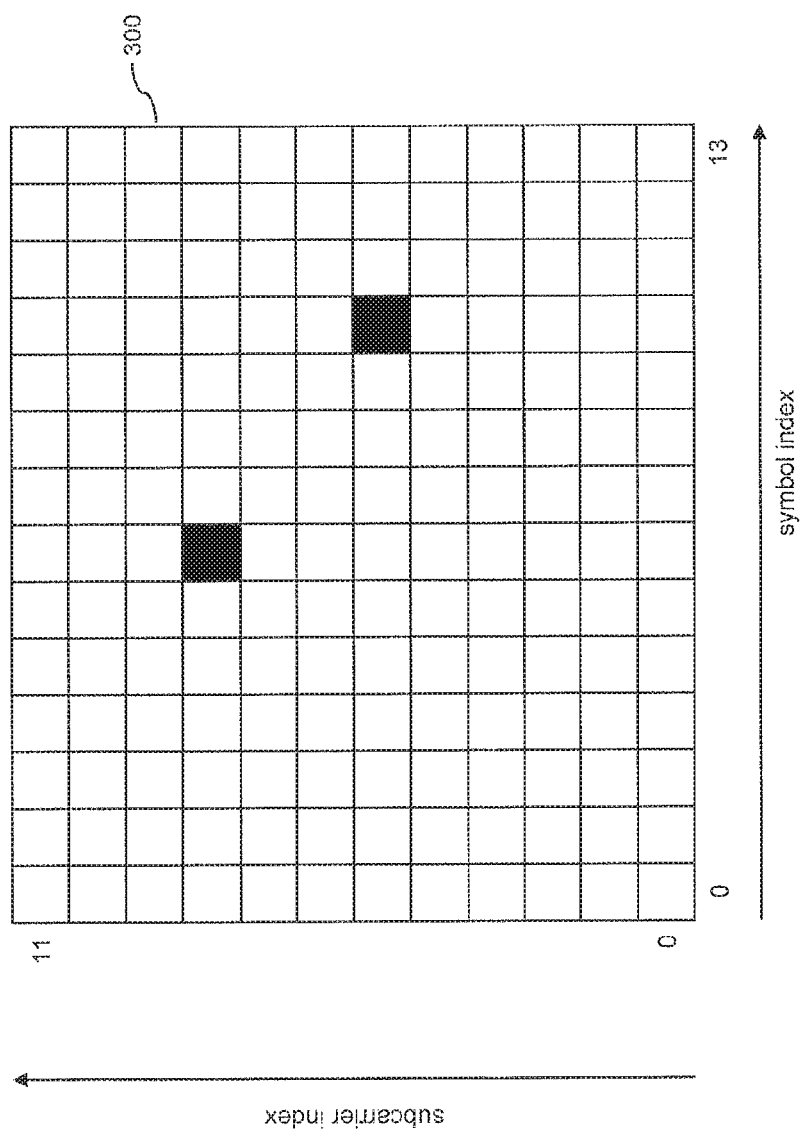
FIG. 3 illustrates an example of a blanking pattern according to an embodiment of the invention.

FIG. 3 shows an example of a blanking pattern 300 which may be indicated by the above-mentioned blanking pattern indication. The blanking pattern 300 is defined to cover 12 subcarriers in the frequency domain and 14 modulation symbols in the time domain. The blanking pattern 300 may for example cover a part of the time frequency space which corresponds to one PRB of the LTE radio technology.

As illustrated, the blanking pattern indicates, for each first RE in the covered part of the time frequency space, whether the RE is blanked, i.e., to be disregarded, or not. If the RE is blanked, it will be disregarded when performing radio communication. If the RE is not blanked, it may be utilized for radio communication. In FIG. 3, the blanked REs are illustrated by filled boxes, whereas the REs which are not blanked are illustrated by empty boxes.

As can be seen, each RE of the blanking pattern 300 can be identified by a frequency domain coordinate and by a time domain coordinate. In the illustrated example, the frequency domain coordinate is the subcarrier index, and the time domain coordinate is the symbol index. The frequency domain coordinate and the time domain coordinate may be further specified by indicating the PRB in which the blanking pattern 300 applies, e.g., in terms of a PRB index. In other scenarios, the PRB in which the blanking pattern 300 applies may also be derived from other information. For example, the blanking pattern 300 could be assumed to apply in every PRB or in each PRB which was allocated for transmission.

When assuming that the blanked first REs can be identified by a subcarrier index, a symbol index and a PRB index, as explained above, the blanking pattern indication 300 may define the time domain information and/or frequency domain information by a RE index (RE_index), a PRB index (PRB_index) indicating the PRB including the blanked RE, and an indicator (tf_indicator) whether the RE index is to be interpreted as a subcarrier index or as a symbol index, e.g., in the form of a 3-tuple given by:

$$\left\{ \begin{array}{c} \text{tf\_indicator} \\ \text{RE\_index} \\ \text{PRB\_index} \end{array} \right\} \quad (1)$$

Here, for example a value of tf_indicator=0 may indicate that RE_index is to be interpreted as a symbol index, and a value of tf_indicator=1 may indicate that RE_index is to be interpreted as a subcarrier index. The blanking pattern indication 300 may include one or more of such 3-tuples.

Each of such 3-tuples may be associated with a usage indicator, which may include an indicator (UL-DL_indicator) indicating whether the time domain information and/or frequency domain information specified by the 3-tuple applies to the uplink transmission direction from UE to cellular network (corresponding to the transmit direction from the UE perspective) and/or to the downlink transmission direction from cellular network to UE (corresponding to the receive direction from the UE perspective). Further, the usage indicator may include a combing indicator (COMB_indicator) indicating how the time domain information and/or frequency domain information specified by the 3-tuple shall be combined with the time domain information and/or frequency domain information specified by one or more other 3-tuples of the blanking pattern indication. The usage indicator may for example be provided in the form of a 2-tuple given by:

$$\left\{ \begin{array}{c} \text{UL-DL\_indicator} \\ \text{COMB\_indicator} \end{array} \right\} \quad (2)$$

For example, a value of UL-DL_indicator='DL' may indicate that the time domain information and/or frequency domain information specified by the 3-tuple applies for the downlink transmission direction, a value of UL-DL_indicator='UL' may indicate that the time domain information and/or frequency domain information specified by the 3-tuple applies to the uplink transmission direction, and a value of UL-DL_indicator='DU' may indicate that the time domain information and/or frequency domain information specified by the 3-tuple applies to both the downlink transmission direction and the uplink transmission direction. The combining indicator may for example indicate various kinds of logical combining operations, e.g., AND, OR, NOT. Further, the combining indicator may also indicate whether such combining operations are to be applied according to logical precedence rules, e.g., NOT first, then AND, then OR, or whether such combining operations are to be applied in a sequential order, e.g., in the order in which the 3-tuples and associated usage indicators are arranged in the blanking pattern indication.

Figure 4:
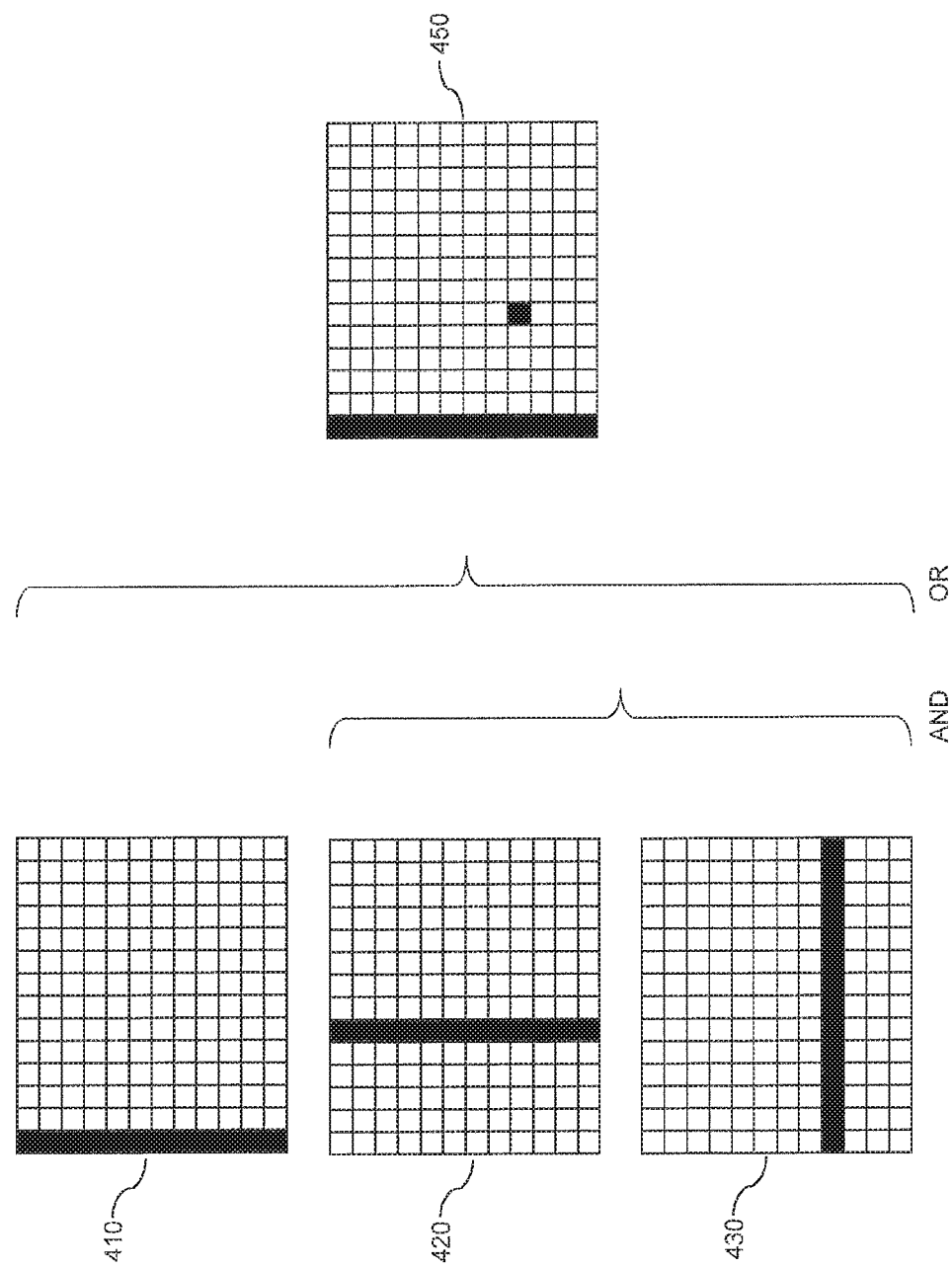
FIG. 4 illustrates an exemplary scenario according to an embodiment of the invention, in which the blanking pattern is obtained by combining multiple indicated patterns according to logical precedence rules.

FIG. 4 illustrates an example in which a first pattern of REs 410, a second pattern of REs 420, and a third pattern of REs 430, e.g., as defined by a first 3-tuple, a second 3-tuple, and a third 3-tuple according to (1), are combined to a blanking pattern 450 by applying logical combinations defined by the corresponding usage indicators and logical precedence rules.

In the example of FIG. 4, the blanking pattern indication may include the following elements:

$$\left\{ \left( \left\{ \begin{array}{c} 0 \\ 0 \\ 0 \end{array} \right\}, \left\{ \begin{array}{c} 'DL' \\ 'OR' \end{array} \right\} \right), \left( \left\{ \begin{array}{c} 0 \\ 5 \\ 0 \end{array} \right\}, \left\{ \begin{array}{c} 'DL' \\ 'AND' \end{array} \right\} \right), \left( \left\{ \begin{array}{c} 1 \\ 3 \\ 0 \end{array} \right\}, \left\{ \begin{array}{c} 'DL' \\ '' \end{array} \right\} \right) \right\} \quad (3)$$

Figure 5:
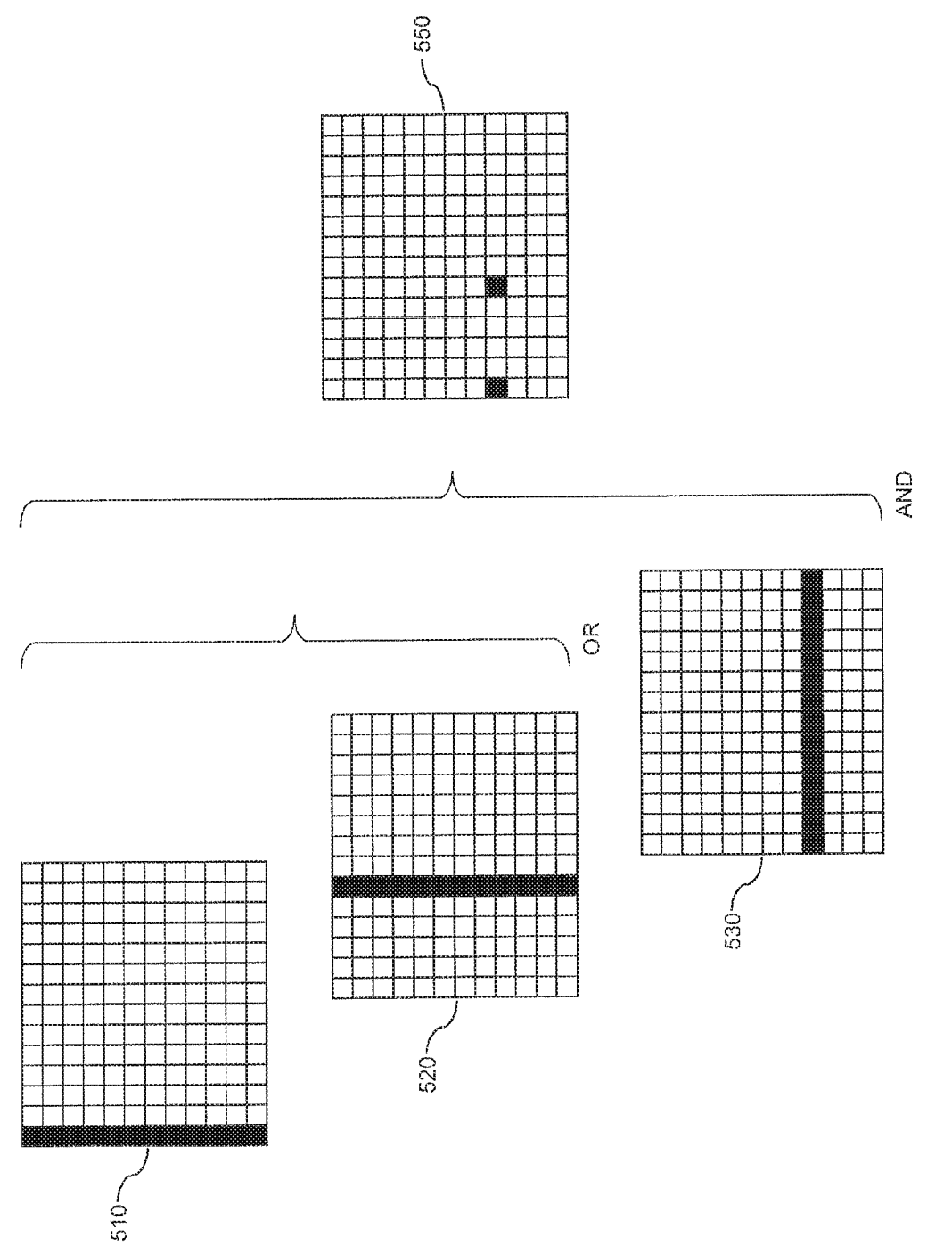
FIG. 5 illustrates an exemplary scenario according to an embodiment of the invention, in which the blanking pattern is obtained by combining multiple indicated patterns according to a sequential order.

FIG. 5 illustrates an example in which a first pattern of REs 510, a second pattern of REs 520, and a third pattern of REs 530, defined in the same way as in the example of FIG. 4 and assuming the same combining indicators as in the example of FIG. 4, are combined to a blanking pattern 550 by applying the logical combinations defined by the usage indicators in a sequential order defined by the arrangement of the 3-tuples and associated usage indicators in (3).

In some implementations, the combining indicator does not need to be explicitly included in the blanking pattern indication. Rather, if multiple sets of time domain information and/or frequency domain information for specifying blanked REs are included in the blanking pattern indication, operations for combining these multiple sets may be derived in an implicit manner, e.g., based on preconfigured rules. Further, in the blanking pattern indication such multiple sets could be arranged in a hierarchical order, i.e., as sets each including subsets, and the combining operation could be determined depending on this hierarchical order. For example, the subsets of a given set could be combined by an 'OR' operation (as union of the subsets), and the sets could be combined by an 'AND' operation (as intersection of the sets).

In some implementations, the applied blanking pattern may also depend on a capability and/or transmission mode of the UE. For example, the capabilities of UEs may differ with respect to performing rate-matching coded signals around the blanked REs: Some UEs may be capable to perform rate matching around individual REs. Some UEs may be capable to perform rate matching only around all REs of a given modulation symbol. Further, some UEs may be capable to perform rate matching only around all REs of a given subcarrier. Further, some UEs may be capable to perform rate matching only around all REs of a given modulation symbol and around all REs of a given subcarrier. These different rate matching capabilities may depend on device characteristics of the UE or on a current transmission mode of the UE.

Figure 6:
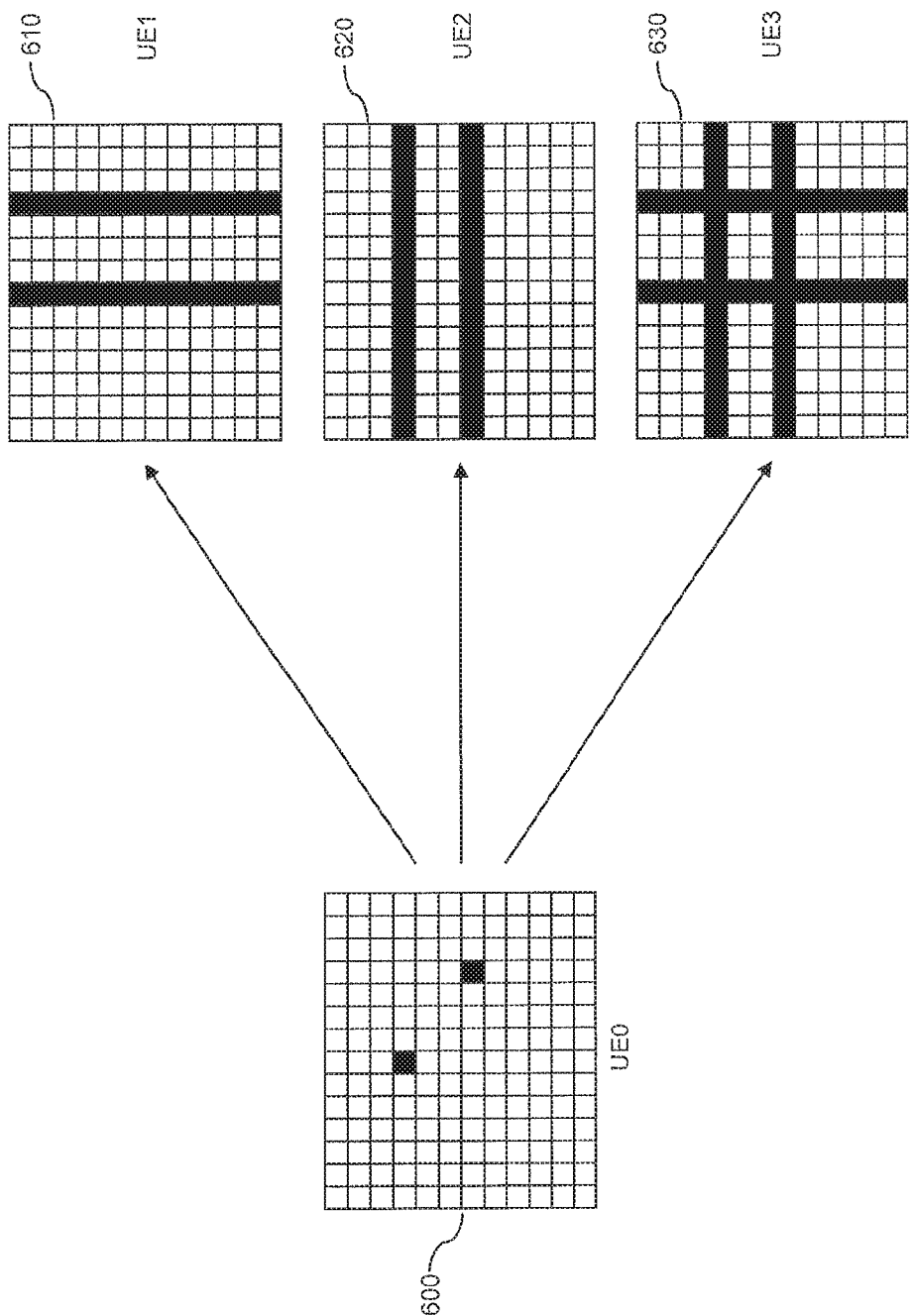
FIG. 6 illustrates an exemplary scenario according to an embodiment of the invention, in which the blanking pattern depends on a capability and/or a transmission mode of a UE which applies the blanking pattern.

An example of how the blanking pattern applied by different UEs may depend on the rate matching capability of the individual UE is illustrated in FIG. 6. In FIG. 6, a blanking pattern 600 as indicated by the blanking pattern indication is assumed to be applied for radio communication with different UEs (UE0, UE1, UE2, UE3), which differ with respect to the capability of performing rate matching around the blanked REs.

For a UE which is capable of performing rate matching around individual REs (in the illustrated example UE0) the blanking pattern 600 may be applied as indicated. For a UE which is capable of performing rate matching only around all REs of a given modulation symbol (in the illustrated example UE1) a blanking pattern 610 may be applied in which all REs having the same symbol index as the blanked REs of the blanking pattern 600 are blanked as well. For a UE which is capable of performing rate matching only around all REs of a given subcarrier (in the illustrated example UE2) a blanking pattern 620 may be applied in which all REs having the same subcarrier index as the blanked REs of the blanking pattern 600 are blanked as well. For a UE which is capable of performing rate matching only around all REs of a given subcarrier and of a given modulation symbol (in the illustrated example UE3) a blanking pattern 630 may be applied in which all REs having the same subcarrier index as the blanked REs of the blanking pattern 600 and all REs having the same symbol index as the blanked REs of the blanking pattern 600 are blanked as well.

The adaptation of the blanking pattern depending on the UE may be accomplished at the UE or at the network node communicating with the UE, based on information about the UE, e.g., UE type or current transmission mode of the UE. Alternatively, the time domain information and/or frequency domain information of the blanking pattern indication may be adapted accordingly.

Figure 7:
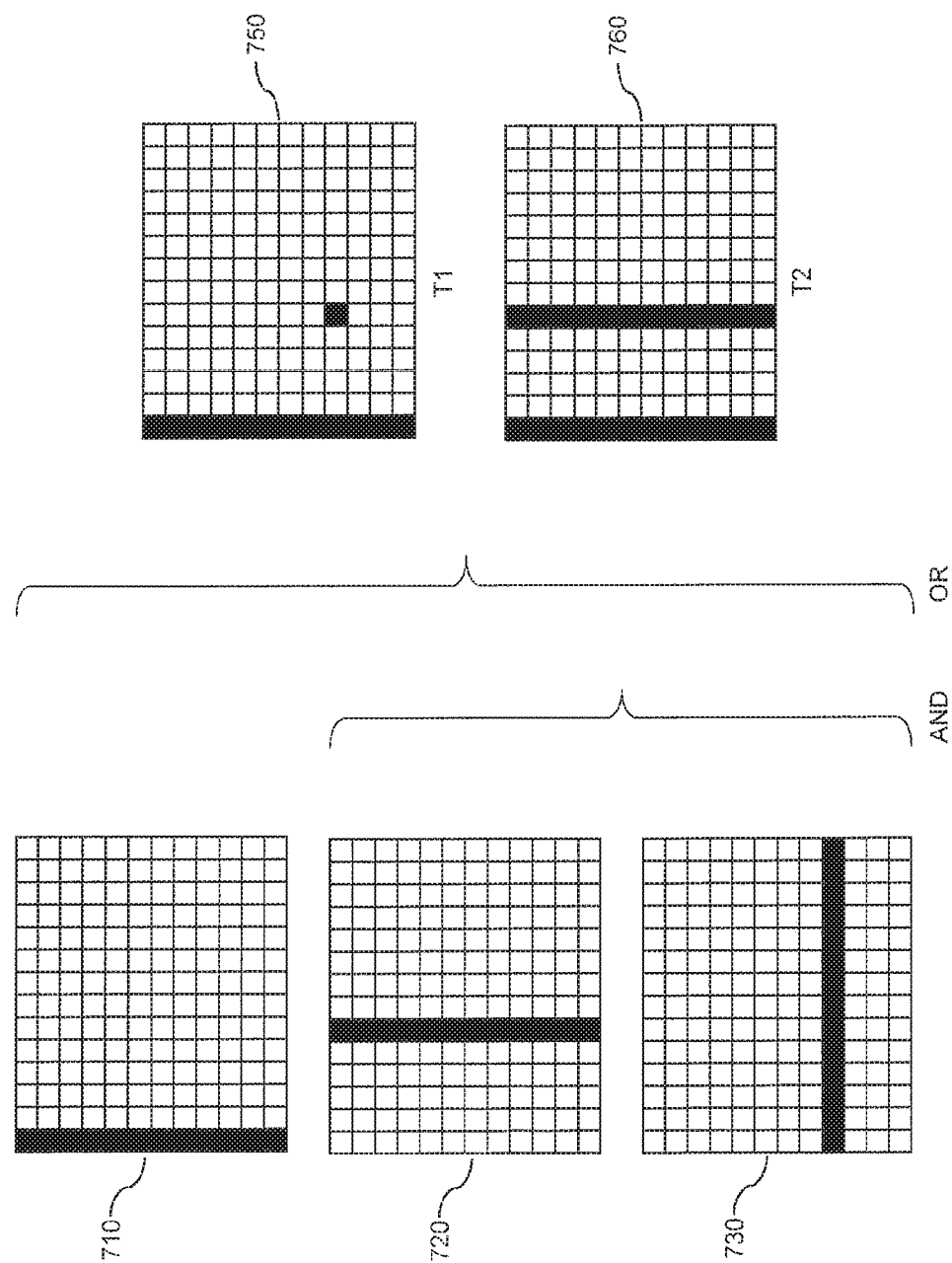
FIG. 7 illustrates an exemplary scenario according to an embodiment of the invention, in which the applied blanking pattern is time dependent.

In some implementations, the applied blanking pattern may be also time dependent. This may for example be achieved by indicating multiple blanking patterns and an associated time validity in the blanking pattern indication. Further, the blanking pattern could also be a combination of multiple indicated patterns of REs, such as explained in connection with FIGS. 4 and 5. In such cases the time dependency of the applied blanking pattern may also be obtained by associating one or more of these multiple indicated patterns with a time validity. FIG. 7 illustrates a corresponding example, in which a first pattern of REs 710, a second pattern of REs 720, and a third pattern of REs 730, defined in the same way as in the example of FIG. 4 and assuming the same combining indicators as in the example of FIG. 4, are combined in a time-dependent manner to either a blanking pattern 750 or to a blanking pattern 760 by applying the logical combinations defined by the usage indicators according to logical precedence rules. In the example of FIG. 7, it is assumed that at time T1, e.g., for certain transmission time intervals, e.g., subframes, defined in the time domain, the patterns 710, 720, and 730 are valid, resulting in the applied blanking pattern 750, while at time T2, e.g., for other transmission time intervals, only the patterns 710 and 720 are valid. The time validity may also defined in terms of periodicities and/or offsets of the indicated patterns. For example, in the scenario of FIG. 7 the patterns 710, 720 may be valid according to a first periodicity, e.g., two times in each transmission time interval, and the pattern 730 may be valid according to a second periodicity, e.g., one time in each transmission time interval, and with and offset with respect to the validity of the patterns 710, 720, e.g., an offset of half a transmission time interval. This would result in a partition of the transmission time interval into two halves, one associated with the blanking pattern 750 and the other with the blanking pattern 750.

Further, the blanking pattern indication may also be used to configure patterns of different sizes which are combined in a time dependent manner to define the applied blanking pattern. An example of a corresponding scenario is illustrated in FIGS. 8, 9A, and 9B.

Figure 8:
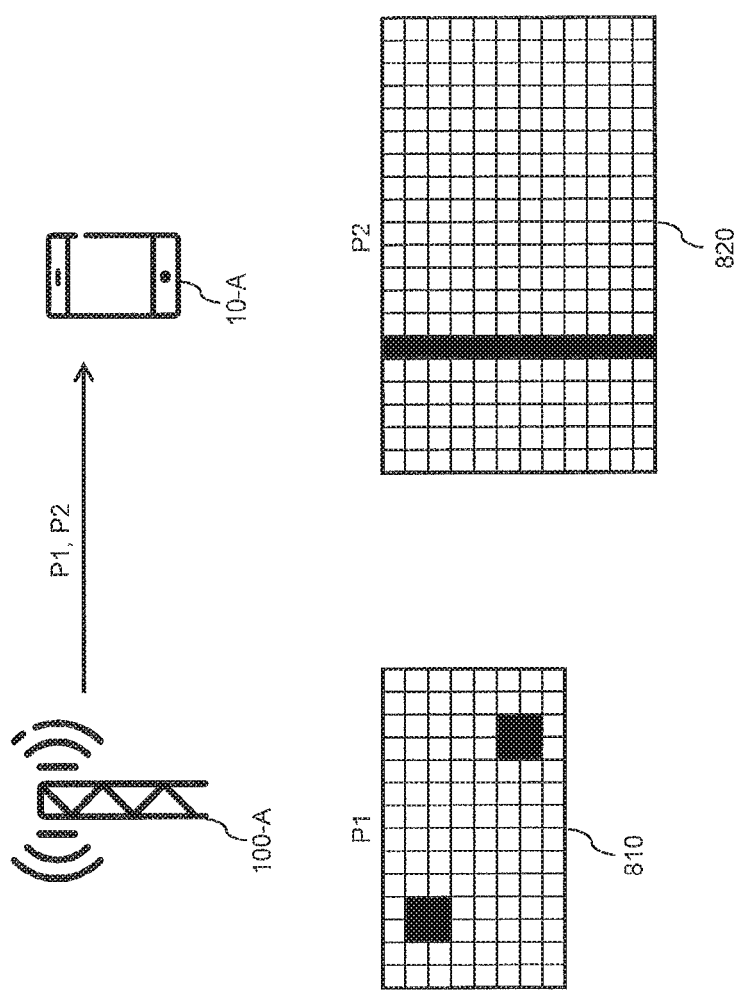
FIGS. 8, 9A and 9B illustrate an exemplary scenario according to an embodiment of the invention, in which blanking patterns are combined in a time-dependent manner from patterns of different size.

As illustrated in FIG. 8, by means of the blanking pattern indication the base station 100-A may indicate two patterns P1, P2 to the UE 10-A. The patterns P1, P2 have different size, i.e., extend over a different number of subcarriers and/or a different number of modulation symbols. The patterns P1, P2 are used as a basis for forming the blanking pattern applied at different times T1, T2. For this purpose, the patterns P1 and/or P2 may be combined in different ways to cover a certain part of the time frequency space. For example, such part of the time frequency space may be defined by an resource assignment for the UE 10-A. Examples of corresponding scenarios are illustrated by FIGS. 9A and 9B.

Figure 9A:
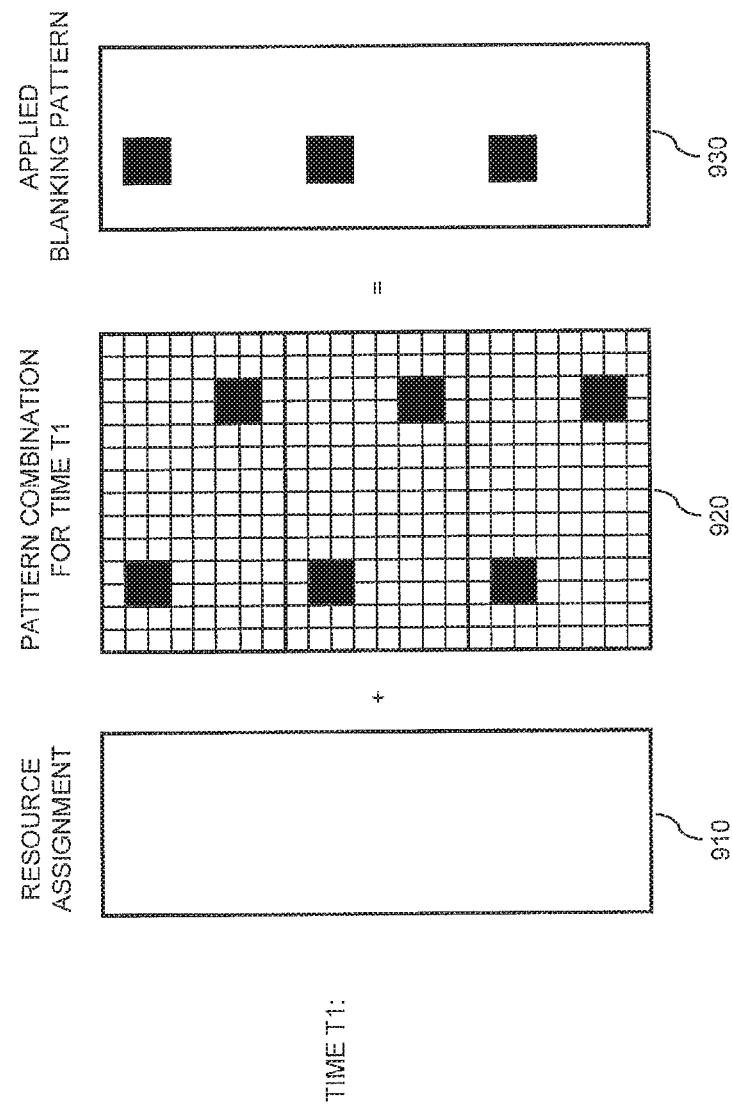

As illustrated in FIG. 9A, at T1 a resource assignment 910 for the UE 10-A is provided, and multiple instances of the pattern P1 are combined, as indicated by 920, to cover the part of the time frequency space defined by the resource assignment 910. The applied blanking pattern 930 at T1 corresponds to the intersection of the part of the time frequency space defined by the resource assignment 910 and the pattern combination 920.

Figure 9B:
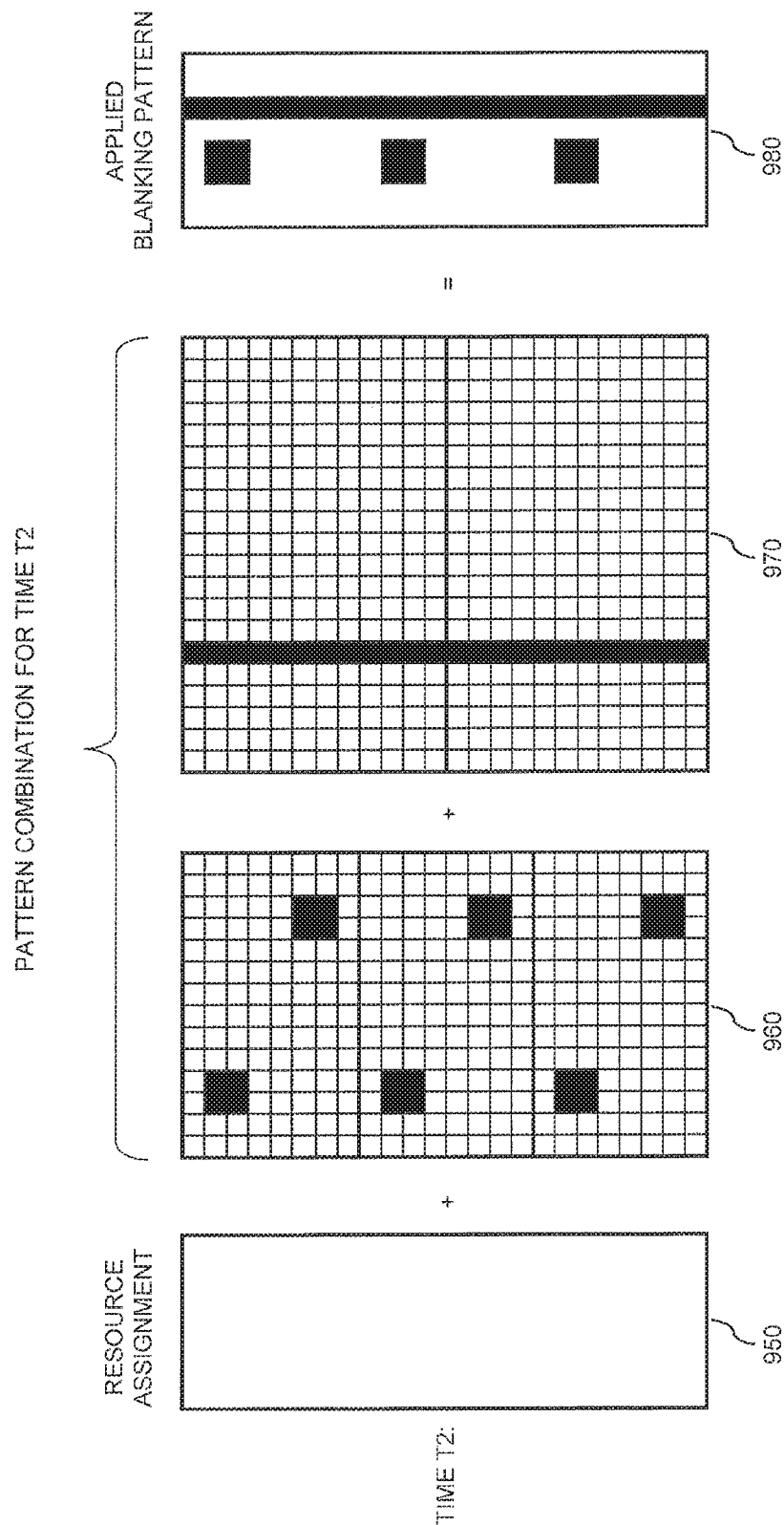

As illustrated in FIG. 9B, at T2 a further resource assignment 950 for the UE 10-A is provided, and multiple instances of the pattern P1, as indicated by 960, and multiple instances of the pattern P2, as indicated by 970, are combined to cover the part of the time frequency space defined by the resource assignment 950. The applied blanking pattern 980 at T2 corresponds to the intersection of the part of the time frequency space defined by the resource assignment 910 and the pattern combination 960, 970.

In some implementations the time validity of a pattern to be used for defining the applied blanking pattern may also be defined with respect to one or more signals, e.g., a synchronization signal. A corresponding scenario is illustrated by FIG. 10.

Figure 10:
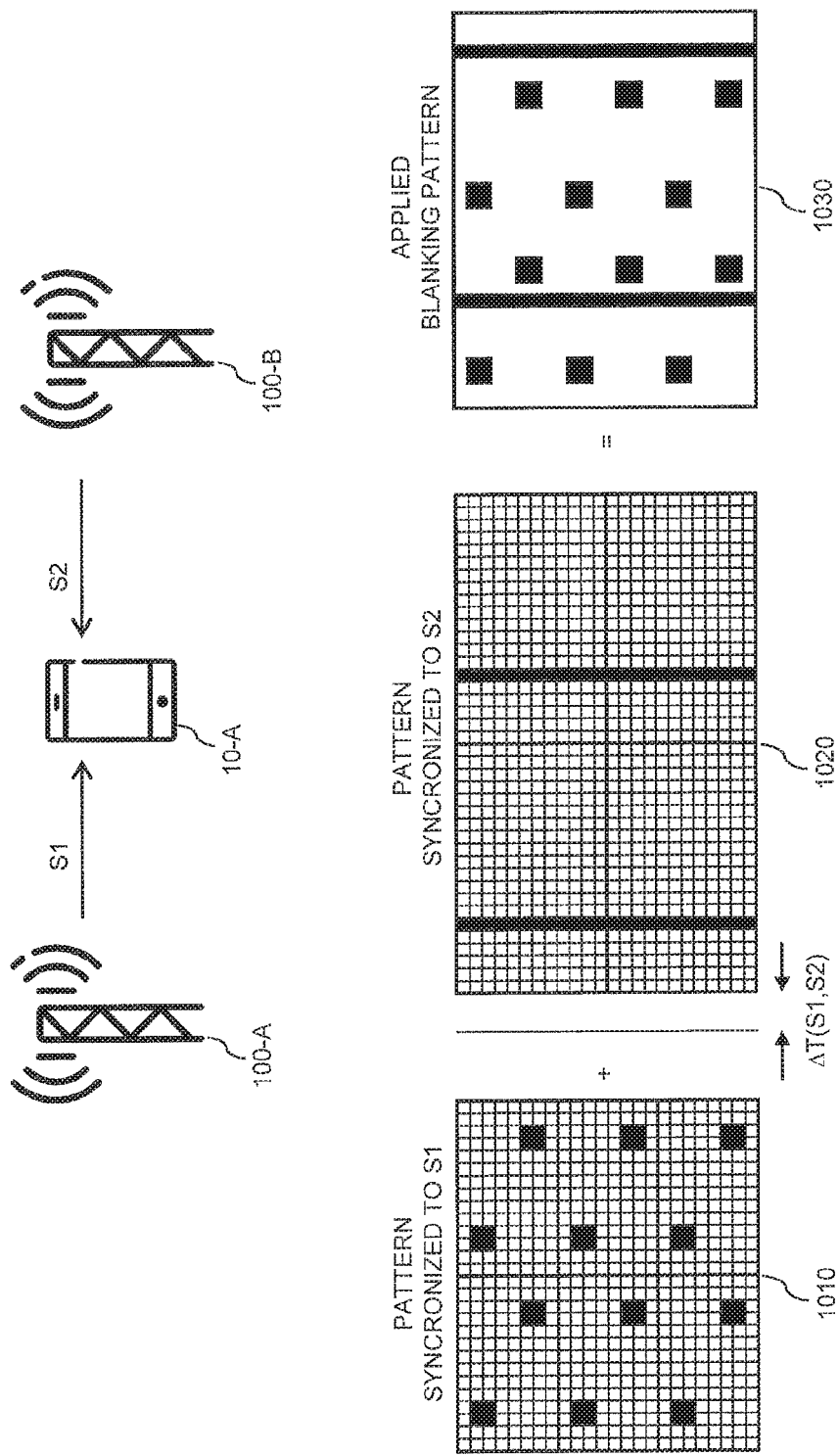
FIG. 10 illustrates an exemplary scenario according to an embodiment of the invention, in which the applied blanking pattern depends on synchronization to signals.

In the scenario of FIG. 10, the base station 100-A transmits a first signal S1, and the base station 100-B transmits a second signal S2. The signals S1, S2 may for example be synchronization signals. The blanking pattern indication is assumed to indicate a first pattern 1010 to be synchronized to the signal S1 and a second pattern to be synchronized to the signal S2. As illustrated, there is a time offset $\Delta T(S1, S2)$ between the signals S1, S2, resulting in a corresponding offset of the synchronized patterns 1010, 1020. Similar to the scenario of FIGS. 9A and 9B, the applied blanking pattern 1030 may then correspond to the intersection of a certain part of the time frequency space, e.g., as defined by a resource assignment, and the combination of the synchronized patterns 1020, 1030.

In some implementations, the applied blanking pattern may also depend on a transmission resource used for the radio communication, e.g., on a beam or antenna port used for the radio communication. In this way, it can for example be taken into account that different Demodulation Reference Signals (DMRS) are used for different antenna ports or beams, and that accordingly different blanking patterns may be needed to disregard the REs to which transmission of these resource specific DMRS is assigned. A corresponding scenario is illustrated by FIG. 11.

Figure 11:
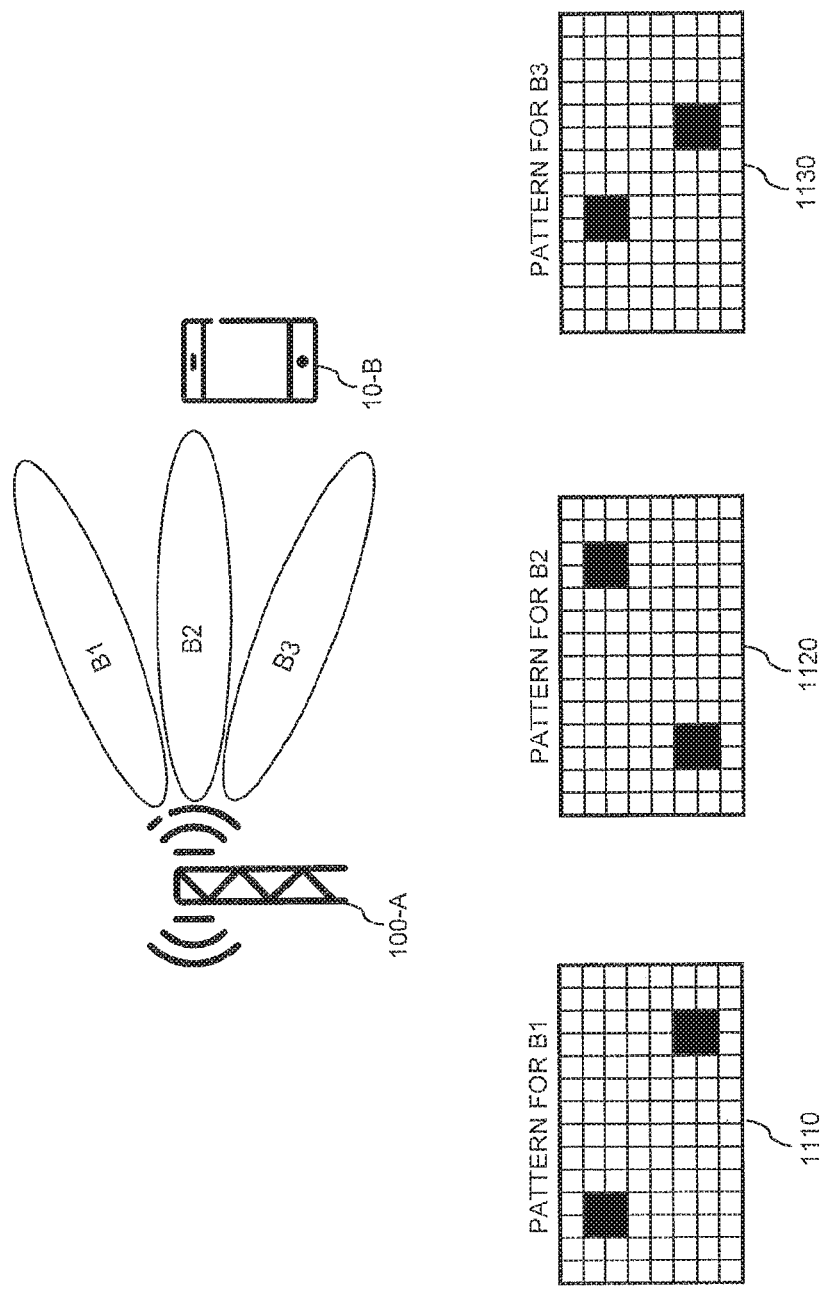
FIG. 11 illustrates an exemplary scenario in which different blanking patterns are associated to corresponding beams utilized for radio communication.

As illustrated in FIG. 11, the base station 100-A may use multiple beams B1, B2, B3 for performing the radio communication with the UE 10-B. However, the UE 10-A may have no support for the different DMRS as applied in the beams B1, B2, B3. Accordingly, the blanking pattern indication can be used to configure the UE 10-A with a different blanking pattern 1110, 1120, 1130 associated with each of the beams B1, B2, B3.

It is to be understood that the above-explained various ways of obtaining the applied blanking pattern from the information included in the blanking pattern indication may also be combined as appropriate, e.g., to obtain a blanking pattern which is both transmission resource and time dependent.

Figure 12:
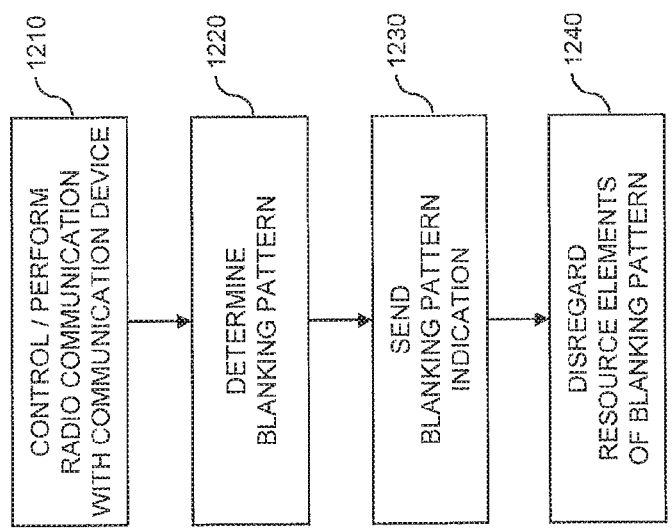
FIG. 12 shows a flowchart for illustrating a method according to an embodiment of the invention, which may be implemented by a node of a cellular network.

FIG. 12 shows a flowchart for illustrating a method of controlling radio communication in a cellular network. The method may be used for implementing the above-described concepts in a node of the cellular network, e.g., in a node corresponding to the base station 100-A of FIGS. 2A, 2B, and 2C. If a processor based implementation of the node is used, the steps of the method may be performed by one or more processors of the node, or the one or more processors of the node may control the node in such a way that the node performs the method. For this purpose, the processor(s) may execute correspondingly configured program code. Further, at least some of the corresponding functionalities may be hardwired in the processor(s).

At step 1210, the node controls or performs radio communication with a communication device, e.g., the UE 10-A or the UE 10-B. The radio communication may be based on a first configuration or a second configuration. The first configuration organizes a time-frequency space in first REs. The second configuration organizes the time-frequency space in second REs and assigns at least one of the second REs to a utilization which is in conflict with the radio communication based on the first configuration. The first configuration and the second configuration may for example correspond to the first configuration CONF #1 and the second configuration CONF #2 of FIG. 1.

At step 1220, the node may determine a pattern. The pattern includes at least one of the first REs which is to be disregarded by the communication device when performing radio communication with the cellular network based on the first configuration and/or the second configuration. The at least one first RE of the pattern defines a first part of the time-frequency space which overlaps a second part of the time-frequency space defined by the at least one of the second REs. Examples of such patterns are the above-mentioned blanking patterns 300, 450, 550, 600, 610, 620, 630, 750, 760, 810, 820, 930, 980, 1030, 1110, 1120, 1130. The node may determine the at least first RE of the pattern depending on the second configuration, e.g., by identifying one or more of the second REs which are assigned to the conflicting utilization and determining the corresponding first RE(s).

In some scenarios, the first configuration defines the first REs based on a first time-frequency grid and the second configuration defines the second REs based on a second time frequency grid which differs from the first time frequency grid, e.g., in terms of time domain size of the REs, frequency domain size of the REs, a time domain offset, a frequency domain offset, or the like. However, the first configuration and the second configuration may also differ merely with respect to the utilization assigned to some of the REs.

In some scenarios, the first configuration assigns the at least one first RE of the pattern to transmission of downlink and/or uplink data and the second configuration assigns the at least one of the second REs to transmission of downlink and/or uplink reference signals. In further scenarios, the first configuration assigns the at least one first RE of the pattern to transmission of downlink and/or uplink reference signals and the second configuration assigns the at least one of the second REs to no transmission of reference signals.

In some scenarios, the pattern may further depend on at least one of a capability and a transmission mode of the communication device. For example, the pattern may depend on a rate matching capability of the communication device, e.g., as explained in connection with FIG. 6.

At step 1230, the node sends an indication to the communication device. The indication includes time domain information and/or frequency domain information for defining the pattern. For example, the time domain information and/or frequency domain information may include at least one of a carrier index identifying a radio carrier in the frequency domain and a symbol index identifying a modulation symbol in the time domain, e.g., a subcarrier index and/or symbol index as utilized in the LTE radio technology. Alternatively, also some other form of time domain coordinate for identifying the time position of a RE and/or frequency domain coordinate for identifying the frequency position of a RE may be utilized in the indication. Further, also information for identifying a certain part of the time frequency space in which such coordinate(s) apply may be included in the indication, e.g., in the form of a PRB index as utilized in the LTE radio technology. Examples of such indication are the above-mentioned blanking pattern indications 20.

The indication may also include information defining whether the operation of disregarding of the at least one first resource element is to be applied to uplink radio communication from the communication device to the cellular network or to downlink radio communication from the cellular network to the communication device, e.g., as part of the above-mentioned usage indicator.

The indication may also include information defining a set of one or more transmission time intervals in which the pattern applies, e.g., in terms of a repetition pattern or rule, a periodicity, or association to specific transmission time intervals. The transmission time intervals may for example correspond to subframes of the LTE radio technology or to parts thereof. Examples of such time dependency of the pattern were explained in connection with FIGS. 7, 8, 9A, and 9B.

The indication may also include information defining a timing of the pattern with respect to one or more signals, e.g., as explained in connection with FIG. 10.

In some scenarios, the indication may also include at least first time domain and/or frequency domain information for defining a first pattern of the first resource elements and second time domain and/or frequency domain information for defining a second pattern of the first resource elements. The pattern may then be a combination of the first pattern and the second pattern. Corresponding examples of obtaining the pattern by combining multiple indicated patterns were explained in connection with FIGS. 4, 5, 7, and 10. In such scenarios, the indication may also include information defining one or more logical operations for combining the first pattern and the second pattern, e.g., as part of the above-mentioned usage indicator. In such cases, the indication may also include information defining a set of one or more transmission time intervals in which the first pattern applies and information defining a set of one or more transmission time intervals in which the second pattern applies, e.g., in terms of a repetition pattern or rule, a periodicity, or association to specific transmission time intervals. The transmission time intervals may for example correspond to subframes of the LTE radio technology or to parts thereof. An example of such time dependent validity of patterns which are combined was explained in connection with FIG. 7. Further, the indication may include information defining a timing of the first pattern and of the second pattern with respect to one or more signals, e.g., as explained in connection with FIG. 10.

In some scenarios, the indication may also include information defining an association of the pattern to a transmission resource to which the pattern applies. This transmission resource could for example be an antenna port, a transmission beam, a time or frequency range, e.g., in terms of a resource block or resource block group, or a code utilized for transmission. An example of a corresponding scenario was explained in connection with FIG. 11.

The node may send the indication directly via a radio link to the communication device, such as in the scenarios of FIGS. 2A and 2B, where the base station 100-A sends the blanking pattern indication 20 via the radio link RL1 to the UE 10-A and via the radio link RL3 to the UE 10-B, or may send the indication indirectly via a further node to the communication device, such as in the scenario of FIG. 2C, where the base station 100-A sends first sends the blanking pattern indication 20' via the backhaul link BHK to the base station 100-B, which then sends the blanking pattern indication 20 via the radio link RL2 to the UE 10-A.

At step 1240, also the node may disregard the at least one first RE of the pattern when performing radio communication based on the first configuration and/or the second configuration. In the latter case, the node may determine the at least one second resource element, e.g., by determining one or more of the second REs which correspond to the at least one first RE of the pattern, i.e., cover the same or an overlapping part of the time frequency space, and disregard the at least one second RE when performing radio communication based on the second configuration.

In some scenarios, the node may also send a further indication to a further node of the cellular network. The further indication may have the same or similar content as the indication of step 1230. In particular, the further indication may also include the time domain and/or frequency domain information for defining the pattern including the at least one of the first REs. By means of the further indication, it is indicated that the at least one first RE of the pattern is also to be disregarded by the further node when performing radio communication based on the first configuration and/or the second configuration. An example of such further indication is the further blanking pattern indication 20' as transmitted in the scenario of FIG. 2A from the base station 100-A to the base station 100-B.

If the first configuration assigns the at least one first RE of the pattern to transmission of data and the second configuration assigns the at least one of the second REs to transmission of reference signals, the operation of disregarding of the at least one first RE of the pattern when performing radio communication based on the first configuration may involve comprises mapping the data to a group of the first REs which excludes the at least one first RE of the pattern. This may also involve rate matching the data around the at least one first RE of the pattern. Further, in this case the operation of disregarding of the at least first RE of the pattern when performing radio communication based on the second configuration may involve comprises mapping the reference signals to a group of the second REs which excludes the at least one of the second REs, i.e., the second RE(s) corresponding to the at least one first RE of the pattern.

If the first configuration assigns the at least one first RE of the pattern to transmission of reference signals and the second configuration assigns the at least one of the second REs to no transmission of reference signals, the operation of disregarding of the at least one first RE of the pattern when performing radio communication based on the first configuration may involve mapping the reference signals to a group of the first REs which excludes the at least one first RE of the pattern. This may also involve rate matching the reference signals around the at least one first RE of the pattern.

In view of the above-described functionalities, a node for implementing the illustrated concepts may be provided with a module configured to control or perform radio communication based on the first configuration and/or second configuration, such as explained in connection with step 1210, a module configured to determine the pattern, such as explained in connection with step 1220, a module configured to send the indication including the time domain information and/or frequency domain information for defining the pattern, such as explained in connection with step 1330, and a module configured to disregard REs when performing radio communication based on the first configuration and/or when performing radio communication based on the second configuration, such as explained in connection with step 1240. Further, the node may be provided with one or more further modules configured to perform further operations as explained in connection with FIG. 12.

Figure 13:
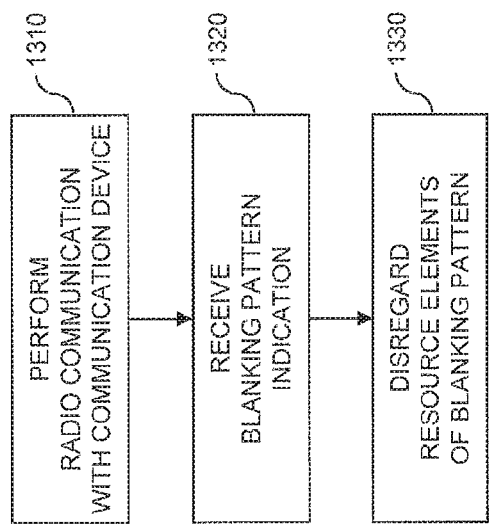
FIG. 13 shows a flowchart for illustrating a further method according to an embodiment of the invention, which may be implemented by a node of a cellular network.

FIG. 13 shows a flowchart for illustrating a method of controlling radio communication in a cellular network. The method may be used for implementing the above-described concepts in a node of the cellular network, e.g., in a node corresponding to the base station 100-B of FIGS. 2A, 2B, and 2C. If a processor based implementation of the node is used, the steps of the method may be performed by one or more processors of the node, or the one or more processors of the node may control the node in such a way that the node performs the method. For this purpose, the processor(s) may execute correspondingly configured program code. Further, at least some of the corresponding functionalities may be hardwired in the processor(s).

At step 1310, the node performs radio communication with a communication device, e.g., the UE 10-A or the UE 10-B. The radio communication may be based on a first configuration or a second configuration. The first configuration organizes a time-frequency space in first REs. The second configuration organizes the time-frequency space in second REs and assigns at least one of the second REs to a utilization which is in conflict with the radio communication based on the first configuration. The first configuration and the second configuration may for example correspond to the first configuration CONF #1 and the second configuration CONF #2 of FIG. 1.

At step 1320, the node receives an indication. The indication includes time domain information and/or frequency domain information for defining a pattern. The pattern includes at least one of the first REs which is to be disregarded when performing radio communication with the communication device based on the first configuration and/or the second configuration. The at least one first RE of the pattern defines a first part of the time-frequency space which overlaps a second part of the time-frequency space defined by the at least one of the second REs. Examples of such patterns are the above-mentioned blanking patterns 300, 450, 550, 600, 610, 620, 630, 750, 760, 810, 820, 930, 980, 1030, 1110, 1120, 1130. Examples of such indication are the above-mentioned blanking pattern indications 20. The node may determine the pattern based on the indication, and optionally also based on further information.

The time domain information and/or frequency domain information may include at least one of a carrier index identifying a radio carrier in the frequency domain and a symbol index identifying a modulation symbol in the time domain, e.g., a subcarrier index and/or symbol index as utilized in the LTE radio technology. Alternatively, also some other form of time domain coordinate for identifying the time position of a RE and/or frequency domain coordinate for identifying the frequency position of a RE may be utilized in the indication. Further, also information for identifying a certain part of the time frequency space in which such coordinate(s) apply may be included in the indication, e.g., in the form of a PRB index as utilized in the LTE radio technology.

In some scenarios, the first configuration defines the first REs based on a first time-frequency grid and the second configuration defines the second REs based on a second time frequency grid which differs from the first time frequency grid, e.g., in terms of time domain size of the REs, frequency domain size of the REs, a time domain offset, a frequency domain offset, or the like. However, the first configuration and the second configuration may also differ merely with respect to the utilization assigned to some of the REs.

In some scenarios, the first configuration assigns the at least one first RE of the pattern to transmission of downlink and/or uplink data and the second configuration assigns the at least one of the second REs to transmission of downlink and/or uplink reference signals. In further scenarios, the first configuration assigns the at least one first RE of the pattern to transmission of downlink and/or uplink reference signals and the second configuration assigns the at least one of the second REs to no transmission of reference signals.

In some scenarios, the pattern may further depend on at least one of a capability and a transmission mode of the communication device. For example, the pattern may depend on a rate matching capability of the communication device, e.g., as explained in connection with FIG. 6.

The indication may also include information defining whether the operation of disregarding of the at least one first resource element is to be applied to uplink radio communication from the communication device to the cellular network or to downlink radio communication from the cellular network to the communication device, e.g., as part of the above-mentioned usage indicator.

The indication may also include information defining a set of one or more transmission time intervals in which the pattern applies, e.g., in terms of a repetition pattern or rule, a periodicity, or association to specific transmission time intervals. The transmission time intervals may for example correspond to subframes of the LTE radio technology or to parts thereof. Examples of such time dependency of the pattern were explained in connection with FIGS. 7, 8, 9A, and 9B.

The indication may also include information defining a timing of the pattern with respect to one or more signals, e.g., as explained in connection with FIG. 10.

In some scenarios, the indication may also include at least first time domain and/or frequency domain information for defining a first pattern of the first resource elements and second time domain and/or frequency domain information for defining a second pattern of the first resource elements. The pattern may then be a combination of the first pattern and the second pattern. Corresponding examples of obtaining the pattern by combining multiple indicated patterns were explained in connection with FIGS. 4, 5, 7, and 10. In such scenarios, the indication may also include information defining one or more logical operations for combining the first pattern and the second pattern, e.g., as part of the above-mentioned usage indicator. In such cases, the indication may also include information defining a set of one or more transmission time intervals in which the first pattern applies and information defining a set of one or more transmission time intervals in which the second pattern applies, e.g., in terms of a repetition pattern or rule, a periodicity, or association to specific transmission time intervals. The transmission time intervals may for example correspond to subframes of the LTE radio technology or to parts thereof. An example of such time dependent validity of patterns which are combined was explained in connection with FIG. 7. Further, the indication may include information defining a timing of the first pattern and of the second pattern with respect to one or more signals, e.g., as explained in connection with FIG. 10.

In some scenarios, the indication may also include information defining an association of the pattern to a transmission resource to which the pattern applies. This transmission resource could for example be an antenna port, a transmission beam, a time or frequency range, e.g., in terms of a resource block or resource block group, or a code utilized for transmission. An example of a corresponding scenario was explained in connection with FIG. 11.

The node may receive the indication via a backhaul link from a further node of the cellular network, such as in the scenarios of FIGS. 2A and 2B, where the base station 100-B receives the blanking pattern indication 20' via the backhaul link BHL from the base station 100-A. Alternatively, the node may receive the indication via a radio link from the communication device, such as in the scenario of FIG. 2B, where the base station 100-B receives the blanking pattern indication 20' from the UE 10-A.

In some scenarios, the node may also send a further indication to the communication device. The further indication may have the same or similar content as the indication of step 1320. In particular, the further indication may also include the time domain and/or frequency domain information for defining the pattern including the at least one of the first REs. By means of the further indication, it is indicated that the at least one first RE of the pattern is also to be disregarded by the communication when performing radio communication based on the first configuration and/or the second configuration. An example of such further indication is the blanking pattern indication 20 as transmitted in the scenario of FIG. 2C from the base station 100-B to the UE 10-A.

At step 1330, the node disregards the at least one first RE of the pattern when performing radio communication based on the first configuration and/or the second configuration. In the latter case, the node may determine the at least one second resource element, e.g., by determining one or more of the second REs which correspond to the at least one first RE of the pattern, i.e., cover the same or an overlapping part of the time frequency space, and disregard the at least one second RE when performing radio communication based on the second configuration.

If the first configuration assigns the at least one first RE of the pattern to transmission of data and the second configuration assigns the at least one of the second REs to transmission of reference signals, the operation of disregarding of the at least one first RE of the pattern when performing radio communication based on the first configuration may involve comprises mapping the data to a group of the first REs which excludes the at least one first RE of the pattern. This may also involve rate matching the data around the at least one first RE of the pattern. Further, in this case the operation of disregarding of the at least first RE of the pattern when performing radio communication based on the second configuration may involve comprises mapping the reference signals to a group of the second REs which excludes the at least one of the second REs, i.e., the second RE(s) corresponding to the at least one first RE of the pattern.

If the first configuration assigns the at least one first RE of the pattern to transmission of reference signals and the second configuration assigns the at least one of the second REs to no transmission of reference signals, the operation of disregarding of the at least one first RE of the pattern when performing radio communication based on the first configuration may involve mapping the reference signals to a group of the first REs which excludes the at least one first RE of the pattern. This may also involve rate matching the reference signals around the at least one first RE of the pattern.

In view of the above-described functionalities, a node for implementing the illustrated concepts may be provided with a module configured to perform radio communication based on the first configuration and/or second configuration, such as explained in connection with step 1310, a module configured to receive the indication including the time domain information and/or frequency domain information for defining the pattern, such as explained in connection with step 1320, and a module configured to disregard REs when performing radio communication based on the first configuration and/or when performing radio communication based on the second configuration, such as explained in connection with step 1330. Further, the node may be provided with one or more further modules configured to perform further operations as explained in connection with FIG. 13.

Figure 14:
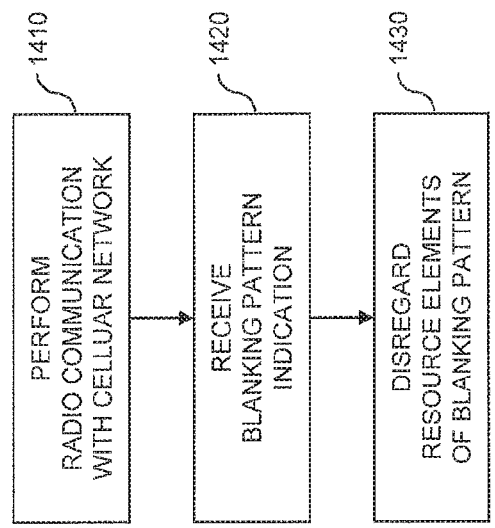
FIG. 14 shows a flowchart for illustrating a further method according to an embodiment of the invention, which may be implemented by a communication device communicating with a cellular network.

FIG. 14 shows a flowchart for illustrating a method of controlling radio communication in a cellular network. The method may be used for implementing the above-described concepts in a communication device operated in a cellular network, e.g., in a communication device corresponding to the UE 10-A or 10-B of FIGS. 2A, 2B, and 2C. If a processor based implementation of the communication device is used, the steps of the method may be performed by one or more processors of the communication device, or the one or more processors of the communication device may control the node in such a way that the communication device performs the method. For this purpose, the processor(s) may execute correspondingly configured program code. Further, at least some of the corresponding functionalities may be hardwired in the processor(s).

At step 1410, the communication device performs radio communication with the cellular network. The radio communication may be based on a first configuration or a second configuration. The first configuration organizes a time-frequency space in first REs. The second configuration organizes the time-frequency space in second REs and assigns at least one of the second REs to a utilization which is in conflict with the radio communication based on the first configuration. The first configuration and the second configuration may for example correspond to the first configuration CONF #1 and the second configuration CONF #2 of FIG. 1.

At step 1420, the communication device receives an indication. The indication includes time domain information and/or frequency domain information for defining a pattern. The pattern includes at least one of the first REs which is to be disregarded by the communication device when performing radio communication with the cellular network based on the first configuration and/or the second configuration. The at least one first RE of the pattern defines a first part of the time-frequency space which overlaps a second part of the time-frequency space defined by the at least one of the second REs. Examples of such patterns are the above-mentioned blanking patterns 300, 450, 550, 600, 610, 620, 630, 750, 760, 810, 820, 930, 980, 1030, 1110, 1120, 1130. Examples of such indication are the above-mentioned blanking pattern indications 20. The communication device may determine the pattern based on the indication, and optionally also based on further information.

The time domain information and/or frequency domain information may include at least one of a carrier index identifying a radio carrier in the frequency domain and a symbol index identifying a modulation symbol in the time domain, e.g., a subcarrier index and/or symbol index as utilized in the LTE radio technology. Alternatively, also some other form of time domain coordinate for identifying the time position of a RE and/or frequency domain coordinate for identifying the frequency position of a RE may be utilized in the indication. Further, also information for identifying a certain part of the time frequency space in which such coordinate(s) apply may be included in the indication, e.g., in the form of a PRB index as utilized in the LTE radio technology.

In some scenarios, the first configuration defines the first REs based on a first time-frequency grid and the second configuration defines the second REs based on a second time frequency grid which differs from the first time frequency grid, e.g., in terms of time domain size of the REs, frequency domain size of the REs, a time domain offset, a frequency domain offset, or the like. However, the first configuration and the second configuration may also differ merely with respect to the utilization assigned to some of the REs.

In some scenarios, the first configuration assigns the at least one first RE of the pattern to transmission of downlink and/or uplink data and the second configuration assigns the at least one of the second REs to transmission of downlink and/or uplink reference signals. In further scenarios, the first configuration assigns the at least one first RE of the pattern to transmission of downlink and/or uplink reference signals and the second configuration assigns the at least one of the second REs to no transmission of reference signals.

In some scenarios, the pattern may further depend on at least one of a capability and a transmission mode of the communication device. For example, the pattern may depend on a rate matching capability of the communication device, e.g., as explained in connection with FIG. 6.

The indication may also include information defining whether the operation of disregarding of the at least one first resource element is to be applied to uplink radio communication from the communication device to the cellular network or to downlink radio communication from the cellular network to the communication device, e.g., as part of the above-mentioned usage indicator.

The indication may also include information defining a set of one or more transmission time intervals in which the pattern applies, e.g., in terms of a repetition pattern or rule, a periodicity, or association to specific transmission time intervals. The transmission time intervals may for example correspond to subframes of the LTE radio technology or to parts thereof. Examples of such time dependency of the pattern were explained in connection with FIGS. 7, 8, 9A, and 9B.

The indication may also include information defining a timing of the pattern with respect to one or more signals, e.g., as explained in connection with FIG. 10.

In some scenarios, the indication may also include at least first time domain and/or frequency domain information for defining a first pattern of the first resource elements and second time domain and/or frequency domain information for defining a second pattern of the first resource elements. The pattern may then be a combination of the first pattern and the second pattern. Corresponding examples of obtaining the pattern by combining multiple indicated patterns were explained in connection with FIGS. 4, 5, 7, and 10. In such scenarios, the indication may also include information defining one or more logical operations for combining the first pattern and the second pattern, e.g., as part of the above-mentioned usage indicator. In such cases, the indication may also include information defining a set of one or more transmission time intervals in which the first pattern applies and information defining a set of one or more transmission time intervals in which the second pattern applies, e.g., in terms of a repetition pattern or rule, a periodicity, or association to specific transmission time intervals. The transmission time intervals may for example correspond to subframes of the LTE radio technology or to parts thereof. An example of such time dependent validity of patterns which are combined was explained in connection with FIG. 7. Further, the indication may include information defining a timing of the first pattern and of the second pattern with respect to one or more signals, e.g., as explained in connection with FIG. 10.

In some scenarios, the indication may also include information defining an association of the pattern to a transmission resource to which the pattern applies. This transmission resource could for example be an antenna port, a transmission beam, a time or frequency range, e.g., in terms of a resource block or resource block group, or a code utilized for transmission. An example of a corresponding scenario was explained in connection with FIG. 11.

The communication device may receive the indication via a radio link from a node of the cellular network, such as in the scenarios of FIGS. 2A, 2B, and 2C, where the UEs 10-A, 10-B receive the blanking pattern indication 20 from the base station 100-A or 100-B.

In some scenarios, the communication device may also send a further indication to a node of the cellular network. The further indication may have the same or similar content as the indication of step 1420. In particular, the further indication may also include the time domain and/or frequency domain information for defining the pattern including the at least one of the first REs. By means of the further indication, it is indicated that the at least one first RE of the pattern is also to be disregarded by the node when performing radio communication based on the first configuration and/or the second configuration. An example of such further indication is the blanking pattern indication 20' as transmitted in the scenario of FIG. 2B from the UE 10-A to the base station 100-B.

At step 1430, the communication device disregards the at least one first RE of the pattern when performing radio communication based on the first configuration and/or the second configuration. In the latter case, the node may determine the at least one second resource element, e.g., by determining one or more of the second REs which correspond to the at least one first RE of the pattern, i.e., cover the same or an overlapping part of the time frequency space, and disregard the at least one second RE when performing radio communication based on the second configuration.

If the first configuration assigns the at least one first RE of the pattern to transmission of data and the second configuration assigns the at least one of the second REs to transmission of reference signals, the operation of disregarding of the at least one first RE of the pattern when performing radio communication based on the first configuration may involve comprises mapping the data to a group of the first REs which excludes the at least one first RE of the pattern. This may also involve rate matching the data around the at least one first RE of the pattern. Further, in this case the operation of disregarding of the at least first RE of the pattern when performing radio communication based on the second configuration may involve comprises mapping the reference signals to a group of the second REs which excludes the at least one of the second REs, i.e., the second RE(s) corresponding to the at least one first RE of the pattern.

If the first configuration assigns the at least one first RE of the pattern to transmission of reference signals and the second configuration assigns the at least one of the second REs to no transmission of reference signals, the operation of disregarding of the at least one first RE of the pattern when performing radio communication based on the first configuration may involve mapping the reference signals to a group of the first REs which excludes the at least one first RE of the pattern. This may also involve rate matching the reference signals around the at least one first RE of the pattern.

In view of the above-described functionalities, a communication device for implementing the illustrated concepts may be provided with a module configured to perform radio communication based on the first configuration and/or second configuration, such as explained in connection with step 1410, a module configured to receive the indication including the time domain information and/or frequency domain information for defining the pattern, such as explained in connection with step 1420, and a module configured to disregard REs when performing radio communication based on the first configuration and/or when performing radio communication based on the second configuration, such as explained in connection with step 1430. Further, the communication device may be provided with one or more further modules configured to perform further operations as explained in connection with FIG. 14.

It should be noted that the above concepts may also be implemented in a system including a node operating according to the method of FIG. 12 and a communication device operating according to the method of FIG. 14. Further, the above concepts may also be implemented in a system including a node operating according to the method of FIG. 13 and a communication device operating according to the method of FIG. 14. Further, the above concepts may also be implemented in a system including a node operating according to the method of FIG. 12 and a node operating according to the method of FIG. 13. Further, the above concepts may also be implemented in a system including a node operating according to the method of FIG. 12, a node operating according to the method of FIG. 13, and a communication device operating according to the method of FIG. 14.

Figure 15:
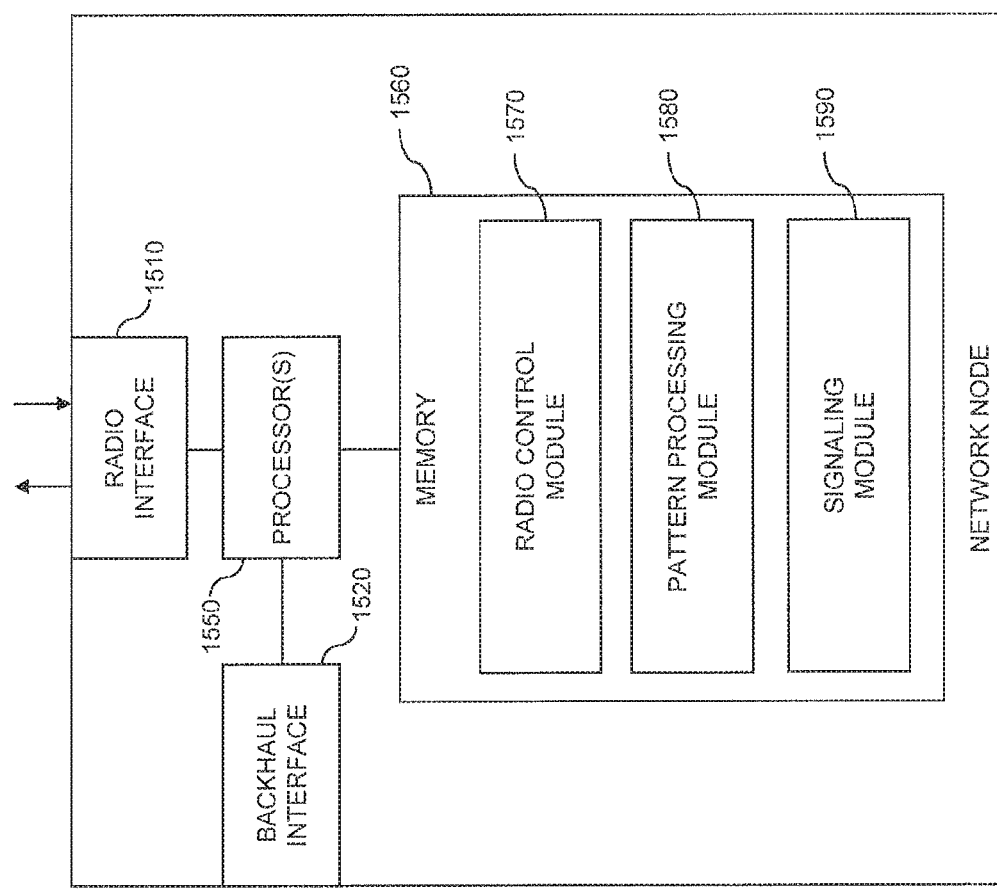
FIG. 15 schematically illustrates structures of a cellular network node according to an embodiment of the invention.

FIG. 15 illustrates exemplary structures which may be used for implementing the above concepts in a node of a cellular network, e.g., the base station 100-A or 100-B.

As illustrated, the node may include an interface 1510 for connecting to communication devices, e.g., to the UEs 10-A, 10-B. If the node corresponds to a base station or other kind of radio access node, the interface 1510 may be a radio interface. The interface 1510 may be utilized for sending the above-mentioned blanking pattern indication to a communication device. Further, the interface 1510 may be utilized for receiving the above-mentioned blanking pattern indication from a communication device. Further, the interface 1510 may be utilized for controlling or performing radio communication with the communication devices.

Further, the node includes one or more processors 1550 coupled to the interface 1510, and a memory 1560 coupled to the processor(s) 1550. The memory 1560 may include a Read Only Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory 1560 includes suitably configured program code to be executed by the processor(s) 1550 so as to implement the above-described functionalities of a cellular network node. In particular, the memory 1560 may include various program code modules for causing the node to perform processes as described above, e.g., corresponding to the method steps of FIG. 12 or 13. As illustrated, the memory 1560 may include a radio control module 1570 for implementing the above-described functionalities of performing or controlling radio communication, e.g., as explained in connection with step 1210 of FIG. 12 or step 1310 of FIG. 13. Further, the memory 1560 may include a pattern processing module 1580 for implementing the above-described functionalities of determining the blanking pattern to be sent or to be applied by the node, such as explained in connection with step 1220 of FIG. 12 or step 1320 of FIG. 13. Further, the memory 1560 may include a signaling module 1590 for implementing the above-described functionalities of sending or receiving the blanking pattern indication.

It is to be understood that the structures as illustrated in FIG. 15 are merely schematic and that the node may actually include further components which, for the sake of clarity, have not been illustrated, e.g., further interfaces or processors. Also, it is to be understood that the memory 1560 may include further types of program code modules, which have not been illustrated, e.g., program code modules for implementing known functionalities of a cellular network base station, such as an eNB of the LTE radio technology. According to some embodiments, also a computer program may be provided for implementing functionalities of the node, e.g., in the form of a physical medium storing the program code and/or other data to be stored in the memory 1560 or by making the program code available for download or by streaming.

Figure 16:
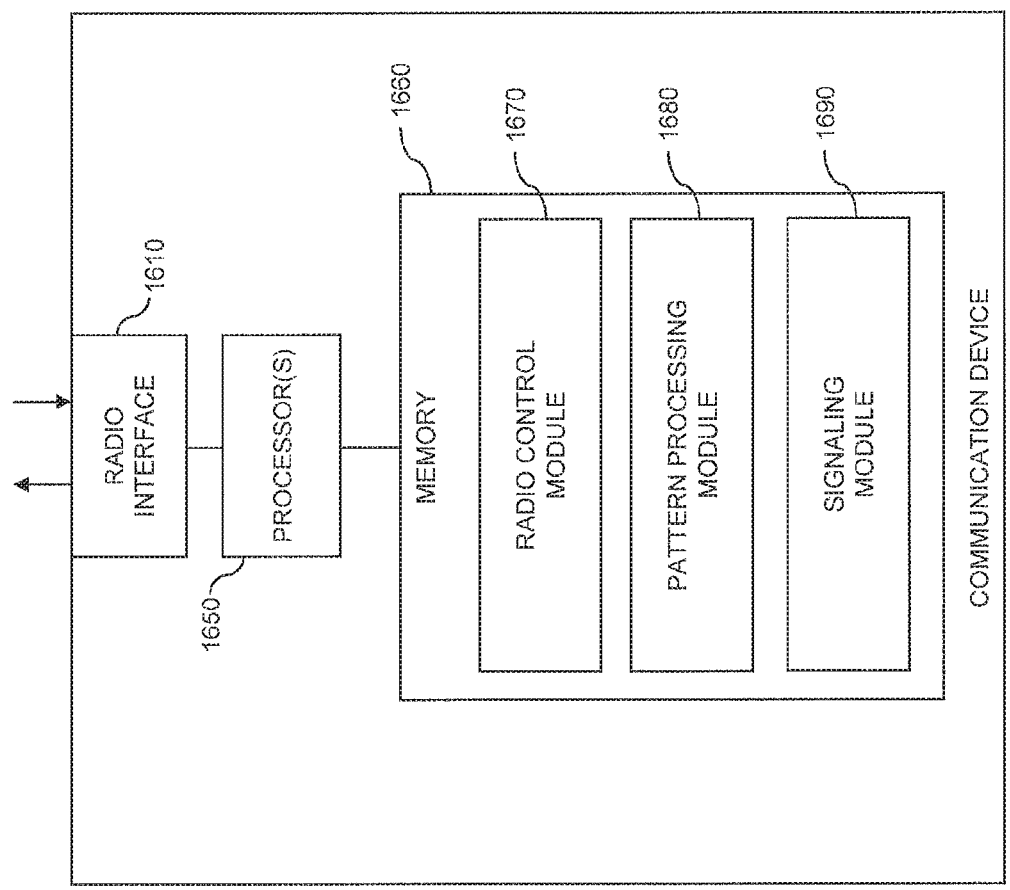
FIG. 16 schematically illustrates structures of a communication device according to an embodiment of the invention.

FIG. 16 illustrates exemplary structures which may be used for implementing the above concepts in a communication device, e.g., the UE 10-A or 10-B.

As illustrated, the communication device may include a radio interface 1610 for connecting to a cellular network. For example, the radio interface 1610 may correspond to a radio interface as specified for the LTE radio technology. The interface 1610 may be utilized for receiving the above-mentioned blanking pattern indication from a node of the cellular network. Further, the interface 1610 may be utilized for sending the above-mentioned blanking pattern indication to a node of the cellular network. Further, the interface 1610 may be utilized for performing radio communication with the cellular network.

Further, the communication device includes one or more processors 1650 coupled to the radio interface 1610, and a memory 1660 coupled to the processor(s) 1650. The memory 1660 may include a ROM, e.g., a flash ROM, a RAM, e.g., a DRAM or SRAM, a mass storage, e.g., a hard disk or solid state disk, or the like. The memory 1660 includes suitably configured program code to be executed by the processor(s) 1650 so as to implement the above-described functionalities of a communication device. In particular, the memory 1660 may include various program code modules for causing the communication device to perform processes as described above, e.g., corresponding to the method steps of FIG. 14. As illustrated, the memory 1660 may include a radio control module 1670 for implementing the above-described functionalities of performing radio communication, e.g., as explained in connection with step 1410 of FIG. 14. Further, the memory 1660 may include a pattern processing module 1680 for implementing the above-described functionalities of determining the blanking pattern to be sent or to be applied by the communication device, such as explained in connection with step 1420 of FIG. 14. Further, the memory 1660 may include a signaling module 1690 for implementing the above-described functionalities of sending or receiving the blanking pattern indication.

It is to be understood that the structures as illustrated in FIG. 16 are merely schematic and that the communication device may actually include further components which, for the sake of clarity, have not been illustrated, e.g., further interfaces or processors. Also, it is to be understood that the memory 1660 may include further types of program code modules, which have not been illustrated, e.g., program code modules for implementing known functionalities of a UE. According to some embodiments, also a computer program may be provided for implementing functionalities of the communication device, e.g., in the form of a physical medium storing the program code and/or other data to be stored in the memory 1660 or by making the program code available for download or by streaming.

As can be seen, the concepts as described above may be used for improving compatibility of communication devices or network nodes with respect to conflicting utilization of radio resources in different configurations, such as configurations according to different versions of the same radio technology or even configurations according to different radio technologies. By providing the blanking pattern indication with the time domain information and/or frequency domain information, it becomes possible to flexibly define REs which are to be disregarded, thereby avoiding adverse impact due to conflicting utilization assignments of these REs by the different configurations.

It is to be understood that the examples and embodiments as explained above are merely illustrative and susceptible to various modifications. For example, various formats may be utilized for the blanking pattern indication, and various kinds of protocols or messages may be utilized for conveying the blanking pattern indication. Further, it is to be understood that the above-mentioned first and second configuration are merely exemplary, and that the illustrated concepts may be applied with respect to any constellation in which different configurations used for radio communication are possibly affected by conflicting utilization assignments of radio resources. Further, it is to be understood that the illustrated nodes may be implemented by a single device or by a system of multiple devices. Moreover, it is to be understood that the above concepts may be implemented by using correspondingly designed software to be executed by one or more processors of an existing device, or by using dedicated device hardware.

What is claimed is:

1. A method in a user equipment for performing radio communication with a network node of a cellular network based on a first configuration which organizes a time-frequency space in resource elements, the method comprising:

receiving an indication from the network node, the indication indicating a blanking pattern which defines at least one of the first resource elements of the first configuration which is to be disregarded when performing radio communication based on the first configuration, the indication comprising at least a first set of time domain information and a second set of frequency information for specifying the at least one first resource element of the blanking pattern, wherein the frequency information comprises a Physical Resource Block (PRB) index for identifying a PRB and the time domain information comprises a symbol index, wherein the blanking pattern is an intersection of the first and second sets.

2. The method according to claim 1, the method further comprising:

disregarding the at least one first resource element indicated by the indication when performing radio communication with the network node based on the first configuration.

3. The method according to claim 2, wherein the step of disregarding the at least one first resource element indicated by the indication includes rate matching received or transmitted signals around the disregarded at least one first resource element.

4. The method according to claim 1, wherein the user equipment applies the blanking pattern depending on a capability of the user equipment, wherein the capability of the user equipment relates to performing rate matching around individual resource elements.

5. The method according to claim 1, wherein the indication comprises information about a time validity of the blanking pattern, wherein the time validity is used for applying the blanking pattern.

6. The method according to claim 1, wherein the indication comprises information defining a set of one or more transmission time intervals in which the blanking pattern applies.

7. The method according to claim 1, wherein the indication comprises information indicating that the blanking pattern is to be applied for downlink transmissions or for uplink transmissions.

8. The method according to claim 1, wherein the first and second sets are combined by an logical AND combination as the intersection of the first and second sets.

9. The method according to claim 1, wherein the user equipment is configured to support radio communication based on a second configuration which organizes the time-frequency space in second resource elements, wherein an utilization of the at least one resource element of the first configuration is in conflict with an utilization of at least one second resource element of the second resource elements, wherein the at least first resource element indicated by the indication partly overlaps with the at least one second resource element of the second configuration.

10. The method according to claim 9, wherein the first resource elements are identical to the second resource elements.

11. The method according to claim 9, wherein the first resource elements are different from the second resource elements with respect to a subcarrier spacing and/or modulation symbol time duration of the respective resource elements.

12. The method according to claim 9, the method further comprising:

disregarding the at least one first resource element indicated by the indication when performing radio communication based on the second configuration.

13. The method according to claim 9, the method further comprising:

based on the indication, determining the at least one second resource element corresponding to the at least one first resource element and disregarding the at least one second resource element when performing radio communication based on the second configuration.

14. The method according to claim 9, wherein the first resource elements of the first configuration are assigned to transmission of data and the second resource elements of the second configuration are assigned to transmission of data.

15. The method according to claim 9, wherein the first resource elements of the first configuration are assigned to transmission of a first type of reference signal and the second resource elements of the second configuration are assigned to transmission of a second type of reference signal.

16. The method according to claim 9, wherein the first resource elements of the first configuration are assigned to transmission of reference signal and the second resource elements of the second configuration are assigned to no transmission of reference signal or to no transmission of any signal.

17. A method in a network node of a cellular network for performing radio communication with a user equipment based on a first configuration which organizes a time-frequency space in resource elements, the method comprising:

sending an indication to the user equipment, the indication indicating a blanking pattern which defines at least one of the first resource elements of the first configuration which is to be disregarded when performing radio communication based on the first configuration, the indication comprising at least a first set of time domain information and a second set of frequency information for specifying the at least one first resource element of the blanking pattern, wherein the frequency information comprises a Physical Resource Block (PRB) index for identifying a PRB and the time domain information comprises a symbol index, wherein the blanking pattern is an intersection of the first and second sets.

18. The method according claim 17, wherein the indication comprises information about a time validity of the blanking pattern, wherein the time validity is used for applying the blanking pattern.

19. The method according to claim 17, wherein the indication (20) comprises information defining a set of one or more transmission time intervals in which the blanking pattern applies.

20. The method according to claim 17, wherein the indication comprises information indicating that the blanking pattern is to be applied for downlink transmissions or for uplink transmissions.

21. The method according to claim 17, wherein the first and second sets are combined by an logical AND combination as the intersection of the first and second sets.

22. The method according to claim 17, wherein the network node is 49 to support radio communication based on a second configuration which organizes the time-frequency space in second resource elements, wherein an utilization of the at least one resource element of the first configuration is in conflict with an utilization of at least one second resource element of the second resource elements, wherein the at least first resource element indicated by the indication partly overlaps with the at least one second resource element of the second configuration.

23. The method according to claim 22, wherein the first resource elements are identical to the second resource elements.

24. The method according to claim 22, wherein the first resource elements are different from the second resource elements with respect to a subcarrier spacing and/or modulation symbol time duration of the respective resource elements.

25. The method according to claim 22, wherein the first resource elements of the first configuration are assigned to transmission of data and the second resource elements of the second configuration are assigned to transmission of data.

26. The method according to claim 22, wherein the first resource elements of the first configuration are assigned to transmission of a first type of reference signal and the second resource elements of the second configuration are assigned to transmission of a second type of reference signal.

27. The method according to claim 22, wherein the first resource elements of the first configuration are assigned to transmission of reference signal and the second resource elements of the second configuration are assigned to no transmission of reference signal or to no transmission of any signal.

* * * * *

UNITED STATES PATENT AND TRADEMARK OFFICE
CERTIFICATE OF CORRECTION

PATENT NO. : 10,892,871 B2
APPLICATION NO. : 16/859123
DATED : January 12, 2021
INVENTOR(S) : Fröberg Olsson et al.

It is certified that error appears in the above-identified patent and that said Letters Patent is hereby corrected as shown below:

In the Specification

In Column 1, Line 8, delete "2018," and insert -- 2018, U.S. patent Ser. No. 10,673,589 issued June 2, 2020, --, therefor.

In Column 2, Line 12, delete "based different" and insert -- based on different --, therefor.

In Column 8, Line 12, delete "one ore more" and insert -- one or more --, therefor.

In Column 8, Line 63, delete "technology This" and insert -- technology. This --, therefor.

In Column 13, Lines 64-65, delete "also defined" and insert -- also be defined --, therefor.

In Column 14, Line 4, delete "and offset" and insert -- an offset --, therefor.

In Column 14, Lines 42-43, delete "resource assignment 910" and insert -- resource assignment 950 --, therefor.

In Column 14, Line 61-62, delete "synchronized patterns 1020, 1030." and insert -- synchronized patterns 1010, 1020. --, therefor.

In Column 18, Lines 27-28, delete "step 1330," and insert -- step 1230, --, therefor.

In the Claims

In Column 27, Line 9, in Claim 1, delete "of the" and insert -- of --, therefor.

In Column 27, Line 57, in Claim 9, delete "one resource" and insert -- one first resource --, therefor.

In Column 27, Line 60, in Claim 9, delete "least" and insert -- least one --, therefor.

Signed and Sealed this
Eleventh Day of January, 2022

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,892,871 B2

In Column 28, Line 38, in Claim 17, delete "of the" and insert -- of --, therefor.

In Column 29, Line 2, in Claim 22, delete "one resource" and insert -- one first resource --, therefor.

In Column 29, Line 5, in Claim 22, delete "least" and insert -- least one --, therefor.